US008656497B2

(12) United States Patent
Amarasinghe et al.

(10) Patent No.: US 8,656,497 B2
(45) Date of Patent: *Feb. 18, 2014

(54) CONSTRAINT INJECTION SYSTEM FOR IMMUNIZING SOFTWARE PROGRAMS AGAINST VULNERABILITIES AND ATTACKS

(75) Inventors: Saman P. Amarasinghe, Waltham, MA (US); Bharath Chandramohan, Santa Clara, CA (US); Charles Renert, Palo Alto, CA (US); Derek L. Bruening, Troy, NY (US); Vladimir Kiriansky, Los Altos, CA (US); Timothy Garnett, Boston, MA (US); Sandy Wilbourn, Palo Alto, CA (US); Warren Wu, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/078,470

(22) Filed: Apr. 1, 2011

(65) Prior Publication Data
US 2011/0185433 A1 Jul. 28, 2011

Related U.S. Application Data

(63) Continuation of application No. 11/422,547, filed on Jun. 6, 2006, now Pat. No. 7,945,958.

(60) Provisional application No. 60/688,099, filed on Jun. 7, 2005.

(51) Int. Cl.
*G06F 11/00* (2006.01)

(52) U.S. Cl.
USPC .......................................................... 726/25

(58) Field of Classification Search
USPC .............. 726/22–25; 717/106, 127, 129, 131, 717/126, 168; 713/188
See application file for complete search history.

(56) References Cited

U.S. PATENT DOCUMENTS

| 5,193,180 A | 3/1993 | Hastings |
| 5,974,549 A * | 10/1999 | Golan .............................. 726/23 |
| 6,185,669 B1 | 2/2001 | Hsu |
| 6,189,141 B1 | 2/2001 | Benitez |
| 6,199,202 B1 | 3/2001 | Coutant |

(Continued)

FOREIGN PATENT DOCUMENTS

CN 1475909 A 2/2004

OTHER PUBLICATIONS

European Search Report for European Patent Application No. 06772339.5 dated May 18, 2012.
Hunt et al., "Detours: Binary Interception of WIN32 Functions", Internet Citation, Feb. 1999, XP002146206, Retrieved from the Internet: URL:ftp://ftp.research.microsoft.com/pub/tr/tr-98-33.pdf (retrieved on Aug. 31, 2999).
McCarty, "1.1. Software Threats and the Internet", IN: "SELinux", Oct. 11, 2004, O'Reilly Media, Inc. XP55025441, ISBN: 978-0-59-600716-4.

(Continued)

*Primary Examiner* — Nirav B Patel

(57) ABSTRACT

A constraint is inserted into a program to address a vulnerability of the program to attacks. The constraint includes a segment of code that determines when the program has been asked to execute a "corner case" which does not occur in normal operations. The constraint code can access a library of detector and remediator functions to detect various attacks and remediate against them. Optionally, the detector can be employed without the remediator for analysis. The context of the program can be saved and restored if necessary to continue operating after remediation is performed. The constraints can include descriptors, along with machine instructions or byte code, which indicate how the constraints are to be used.

21 Claims, 12 Drawing Sheets

(56) References Cited

U.S. PATENT DOCUMENTS

| | | |
|---|---|---|
| 6,205,545 B1 | 3/2001 | Shah |
| 6,219,832 B1 | 4/2001 | Buzbee |
| 6,223,339 B1 | 4/2001 | Shah |
| 6,237,065 B1 | 5/2001 | Banjerjia |
| 6,243,668 B1 | 6/2001 | Le |
| 6,247,172 B1 | 6/2001 | Dunn |
| 6,255,744 B1 | 7/2001 | Shih |
| 6,275,981 B1 | 8/2001 | Buzbee |
| 6,279,081 B1 | 8/2001 | Spencer |
| 6,295,644 B1 | 9/2001 | Hsu |
| 6,298,445 B1 | 10/2001 | Shostack |
| 6,301,699 B1 | 10/2001 | Hollander |
| 6,314,560 B1 | 11/2001 | Dunn |
| 6,317,870 B1 | 11/2001 | Mattson, Jr. |
| 6,327,704 B1 | 12/2001 | Mattson, Jr. |
| 6,351,844 B1 | 2/2002 | Bala |
| 6,374,331 B1 | 4/2002 | Janakiraman |
| 6,377,287 B1 | 4/2002 | Hao |
| 6,378,029 B1 | 4/2002 | Venkitakrishnan |
| 6,412,071 B1 | 6/2002 | Hollander |
| 6,418,530 B2 | 7/2002 | Hsu |
| 6,430,675 B1 | 8/2002 | Hsu |
| 6,430,741 B1 | 8/2002 | Mattson, Jr. |
| 6,453,411 B1 | 9/2002 | Hsu |
| 6,470,492 B2 | 10/2002 | Bala |
| 6,792,546 B1 | 9/2004 | Shanklin |
| 6,895,460 B2 | 5/2005 | Desoli |
| 6,907,519 B2 | 6/2005 | Desoli |
| 6,915,513 B2 | 7/2005 | Duesterwald |
| 6,920,550 B2 | 7/2005 | Desoli |
| 6,928,536 B2 | 8/2005 | Duesterwald |
| 6,976,073 B2 | 12/2005 | Desoli |
| 6,993,754 B2 | 1/2006 | Freudenberger |
| 7,020,871 B2 * | 3/2006 | Bernstein et al. ............ 717/129 |
| 7,032,114 B1 | 4/2006 | Moran |
| 7,043,756 B2 | 5/2006 | Tsafnat |
| 7,051,340 B2 | 5/2006 | Fisher |
| 7,055,146 B1 * | 5/2006 | Durr et al. .................... 717/162 |
| 7,383,540 B2 * | 6/2008 | Kalra ................................ 717/129 |
| 7,409,713 B2 | 8/2008 | Witmann |
| 7,500,226 B2 | 3/2009 | Tillmann et al. |
| 7,665,137 B1 * | 2/2010 | Barton et al. ................... 726/24 |
| 7,685,640 B2 | 3/2010 | Azadet et al. |
| 7,823,201 B1 * | 10/2010 | Xu .................................. 726/22 |
| 7,945,958 B2 | 5/2011 | Amarasinghe et al. |
| 2002/0152455 A1 | 10/2002 | Hundt et al. |
| 2002/0184618 A1 | 12/2002 | Bala |
| 2002/0199172 A1 * | 12/2002 | Bunnell ........................ 717/128 |
| 2003/0033593 A1 | 2/2003 | Duesterwald |
| 2003/0065929 A1 | 4/2003 | Milliken |
| 2003/0101381 A1 | 5/2003 | Mateev |
| 2003/0101439 A1 | 5/2003 | Desoli |
| 2003/0110478 A1 | 6/2003 | Duesterwald |
| 2003/0182653 A1 | 9/2003 | Desoli |
| 2003/0188174 A1 | 10/2003 | Zisowski |
| 2003/0192035 A1 | 10/2003 | Duesterwald |
| 2003/0229801 A1 * | 12/2003 | Kouznetsov et al. ......... 713/200 |
| 2004/0015712 A1 | 1/2004 | Szor |
| 2004/0025165 A1 | 2/2004 | Desoli |
| 2004/0034794 A1 | 2/2004 | Mayer |
| 2004/0064722 A1 | 4/2004 | Neelay |
| 2004/0133777 A1 | 7/2004 | Kiriansky |
| 2004/0250115 A1 * | 12/2004 | Gemmel et al. ............. 713/201 |
| 2004/0255163 A1 | 12/2004 | Swimmer |
| 2005/0005152 A1 | 1/2005 | Singh |
| 2005/0010804 A1 | 1/2005 | Bruening |
| 2005/0108562 A1 | 5/2005 | Khazan et al. |
| 2006/0021029 A1 | 1/2006 | Brickell et al. |
| 2006/0075496 A1 | 4/2006 | Carpenter |
| 2006/0098585 A1 | 5/2006 | Singh |

OTHER PUBLICATIONS

Kiriansky et al., "Secure Execution Via Program Sheperding", Proceedings of the 11th USENIX Security Symposium, Aug. 5-9, 2002, San Francisco, California, Aug. 5, 2002, pp. 191-206, XP009131508, ISBN: 978-1-931971-00-3.

PCT Search Report for PCT/US2006/021981, dated Feb. 1, 2007.

Chinese Office Action for Patent Application 200680029009.9, dated Jun. 21, 2010.

Baratloo et al., "Transparent Run-time Defense Against Stack Smashing Attacks," Proceedings of the USENIX Annual Technical Conference, Jun. 2000.

Bruening et al., "Design and Implementation of a Dynamic Optimization Framework for Windows," 4th Workshop on Feedback-Directed and Dynamic Optimization, Austin, Texas, Dec. 1, 2001.

Dowan et al., "StackGuard: Automatic Adaptive Detection and Prevention of Buffer-Overflow Attacks," In Proc. 7th USENIX Security Symposium, pp. 63-78, San Antonio, Texas, Jan. 1998.

Erlingsson et al., "SASI Enforcement of Security Policies: A Retrospective," Proc. of the New Security Paradigms Workshop, Ontario, Canada, 22-24, Sep. 1999.

Frantzen et al., "StackGhost: Hardware Facilitated Stack Protection," In Proc. 10th USENIX Security Symposium, Washington, DC, Aug. 2001.

Ko et al., "Detecting and Countering System Intrustions Using Software Wrappers," In Proc. 9th USENIX Secitity Symposium, Denver, Colorado, Aug. 2000.

Schneider, "Enforceable Secirity Policies," ACM Transactions on Information and System Security, vol. 3, No. 1, pp. 30-50, Feb. 2000.

Scott et al., "Strata: A Software Dynamic Translation Infrastructure," Workshop on Binary Translation Infrastructure, Sep. 8, 2001.

Wagner et al., "Intrusion Detection via Static Analysis," In IEEE Symposium on Security and Privacy, 2001.

Cowan et al., "FormatGuard: Automatic Protection From Print Format String Vulnerabilities," In Proc. 10th USENIX Secirity Symposium, 9 pages, Washington, DC, Aug. 2001.

Bala et al., "Dynamo: A Transparent Dynamic Optimization System," Proc. of the ACM SIGPLAN Conf., PLDE, Jun. 2000.

Chen et al., "Mojo: A Dynamic Optimization System," In 3rd ACM Workshop on Feedback-Directed and Dynamic Optimization, Dec. 2000.

Cmelik et al., "Shade: A Fast Instruction-Set Simulator for Execution Profiling," SIGMETRICS, 1994.

Hastings et al., "Purify: Fast Detection of Memory Leaks and Access Errors," Proceedings of the Winter USENIX Conference, pp. 125-136, Jan. 1992.

Hollingsworth et al., "Dynamic Power Instrumentation for Scalable Performance Tools," Scalable High Performance Computing Conference, Knoxville, May 1994.

Larus et al., "Rewriting Executable Files to Measure Program Behavior," Software Practice and Experience, vol. 24, pp. 197-218, Mar. 25, 1992.

Ung et al., "Machine-Adaptable Dynamic Binary Translation," Proc. of the ACM SIGPLAN Workshop on Dynamic and Adaptive Compilation and Optimization, Jan. 2000.

Das, "Unification-based Pointer Analysis with Directional Assignments," In Proc. ACM SIGPLAN Conf. on Programming Language Design and Implementation, Vancouver, BC, Canada, Jun. 2000.

Kiriansky et al., "Secure Execution Via Program Shepherding," Proceedings of the 11th USENIX Security Symposium, San Francisco, California, Aug. 2002.

Schultz et al, "Data Mining Methods for Detection of New Malicious Executables," In Proc. of the 2001 IEEE Symposium on Security and Privacy, 12 pages, 2001.

* cited by examiner

```
#include "hotp-lib.h"

/* Maximum length of a filename, according to Microsoft patch */
define MAX_FILENAME_LENGTH 0x7FFE /* The patch point is right before a call to RtlInitUnicodeString. We need to
 * check the length of the first argument to this function (located at ESP+4).
 * If it is greater than the maximum filename length, we return DETECTED. */ hotp_exec_status_t
hotp_ms03_007_ntdll_det (const hotp_context_t *hotp_context)
{
    wchar_t* str = (wchar_t*) POI(ESP+4);

if (str != NULL && wcsnlen(str, MAX_FILENAME_LENGTH) > MAX_FILENAME_LENGTH)
        return HOTP_EXEC_EXPLOIT_DETECTED;

return HOTP_EXEC_EXPLOIT_NOT_DETECTED;
}

/* The protector sets EAX to 0 and changes the control flow to the epilogue
 * of the function, forcing the function to return 0. */ hotp_exec_status_t
hotp_ms03_007_ntdll_prot (hotp_context_t *hotp_context)
{
    EAX = 0;
    return HOTP_EXEC_CHANGE_CONTROL_FLOW | HOTP_EXEC_LOG_EVENT;
}
```

Fig. 9

```
              77F86EE1              push     [ebp+arg_0]
              77F86EE4              lea      eax, [ebp+var_8]
              77F86EE7              push     eax
    patch <-  77F86EE8              call     RtlInitUnicodeString
              77F86EED              lea      eax, [ebp+arg_0]
              77F86EF0              push     eax
              77F86EF1              push     0
                ...                   ...
              77F86EFC              push     [ebp+arg_4]
              77F86EFF              push     eax
              77F86F00              call     sub_77F83AB9
   return ->  77F86F05              leave
              77F86F06              retn     10h
              77F86F06 RtlGetFullPathName_U endp
```

Fig. 10

```xml
<?xml version="1.0" encoding="ISO-8859-1" ?>
<hotpatching vendor="Determina" version="0" timestamp="2006-01-25T22:08:43Z">
  <engine version="30000">
    <policy id="MS03.007A" class="vulnerability" mode="protect" version="1"
          timestamp="2005-10-06T00:57:19Z">

<name>MS03-007</name>
      <description>Long Filename Buffer Overflow in NTDLL</description>

<ref type="msid" id="MS03-007"
          url="http://www.microsoft.com/technet/security/bulletin/MS03-007.mspx"/>
      <ref type="cve" id="CAN-2003-0109"
          url="http://www.cve.mitre.org/cgi-bin/cvename.cgi?name=CAN-2003-0109" />

<os major="2000" minor="SP0" />
      <os major="2000" minor="SP1" />
      <os major="2000" minor="SP2" />
      <os major="2000" minor="SP3" />

<hotpatch-dll filename="liveshield-00000.lss">
        <hash type="sha1">f827510af67f1212c694f4f888a8a576825558eb</hash>
      </hotpatch-dll>

<vulnerability id="ms03-007-ntdll">
        <description>Long Filename Buffer Overflow in NTDLL</description>

<set name="Windows 2000 SP1 uniproc">
          <module pename="ntdll.dll" pechecksum="0x84030"
                petimestamp="0x394193D2" pesize="0x7A000">

<hash start="0x3EAB" length="0x5" type="crc32">4132384015</hash>

<hotpatch precedence="1" offset="0x6EE8">
              <function type="detector" offset="0x1320" />
              <function type="protector" offset="0x1350" return="0x6F05" />
            </hotpatch>
          </module>
        </set>
      </vulnerability>
    </policy>
  </engine>
</hotpatching>
```

Fig. 11

CONSTRAINT INJECTION SYSTEM FOR IMMUNIZING SOFTWARE PROGRAMS AGAINST VULNERABILITIES AND ATTACKS

CROSS-REFERENCE TO RELATED APPLICATIONS

This application is a continuation of and claims benefit of U.S. Patent Application This application claims the benefit of U.S. patent application Ser. No. 11/422,547, filed Jun. 6, 2006, which in turn claims benefit of U.S. Provisional Patent Application 60/688,099, filed Jun. 7, 2005, applications of which are incorporated herein by reference in their entireties.

BACKGROUND

Computer hosts are subject to a variety of attacks, such as denial of service, privilege elevation, directory traversal, buffer overflow, unauthorized remote or local execution/access, information leakage, and the like. Such attacks can be particularly damaging and costly for enterprises such as corporations, governments and other large organizations. As a result, an industry has been developed to protect against such attacks. For example, protective software is developed proactively, in anticipation of future attacks. Although proactive protection can prevent a large class of attacks, host intrusion prevention cannot solely rely on proactive protection. There are many other possible attack vectors available on a system, and no proactive system can guarantee 100% coverage against known and unknown attacks, including those not yet developed. Current applications and operating systems are far too complex for any intrusion prevention system to accurately identify all possible attack vectors. Thus, there is a need for a broad and flexible system that can react to any possible vulnerability or attack in a timely manner.

Further, the current and most effective method of reactively handling vulnerabilities is to patch the system. When a vulnerability is discovered, a patch is created, typically by an independent software vendor (ISV). A Typical patch replaces an executable file or dynamically linked library, requiring a restart of the application or a reboot of the system to activate a patch. A typical patch process involves fixing the bugs in the code, then recompiling the code and releasing an executable with the necessary modules. However, a patch update has many of the disadvantages of a software upgrade: it typically requires a reboot of the application, it is a single monolithic change to the application that can alter the normal operating behavior, eliminating a problematic patch is cumbersome, and there is no customer visibility into the effectiveness of a patch.

A technique is needed for protecting software which addresses the above and other issues.

SUMMARY

The technology herein, roughly described, provides a constraint injection system and technique for protecting software.

The constraint injection system and technique protects precisely in application memory near the vulnerability itself, rather than outside the application memory at the system or network perimeter. A constraint is usually a few machine instructions that are inserted into the program. A constraint can also be inserted into an active application where the program instructions reside in memory. The system and technique provides the capability to address any known type of software flaw, including those that permit attacks such as denial of service, privilege elevation, directory traversal, buffer overflow, unauthorized remote or local execution/access, information leakage, and the like, while maintaining critical business continuity. The system and technique complements conventional patching and, because of the speed with which it can be deployed, reduces the exposure of programs to attacks.

New constraints can be applied to running applications without restart or reboot, and updates can be provided periodically or otherwise as needed. Similarly, there is no need to upgrade hardware or other programs. Furthermore, the constraint injection technique can be run in a detect mode, in which it accurately indicates the risk of user/application interference before the constraint is enabled, and in a protect mode in which the constraint is enabled.

The constraint injection system and technique also enables fine-grained administrative control by a server, group or operating system, for example.

In one embodiment, a computer-implemented method for protecting software includes inserting constraint code into the program at a patch point which is between instructions of the computer program, and executing the constraint code when a control flow of the computer program reaches the patch point. The constraint code may include assembly code or machine instructions, for instance. The constraint code can call a detector for detecting if a vulnerability is invoked in the computer program, and call a remediator, responsive to the detector, for taking remediation action. In one approach, the inserting includes copying a code fragment of the computer program to a cache, and inserting at least one instruction of the constraint code into the code fragment in the cache, between the instructions of the computer program. In another approach, the inserting includes replacing at least one instruction of the computer program with at least one instruction of the constraint code, and storing the at least one replaced instruction at a gateway, in which case no cache is needed.

In another embodiment, a computer-implemented method for protecting software includes identifying a vulnerability in a computer program, developing a constraint for eliminating the vulnerability, the constraint comprising code which is inserted into the computer program at a specified point, and releasing the constraint to at least one customer.

Corresponding systems and program storage devices are also provided.

BRIEF DESCRIPTION OF THE DRAWINGS

FIG. 9 provides the source code (detector and protector functions) of example constraint code.

FIG. 10 provides a disassembly of the source code of FIG. 9 in NTDLL.DLL, a core operating system component used to interact with the Windows® kernel.

FIG. 11 provides an XML file with constraint code that is produced and shipped to customers.

DETAILED DESCRIPTION

1. Introduction—Anatomy of a Vulnerability

Figure 1:
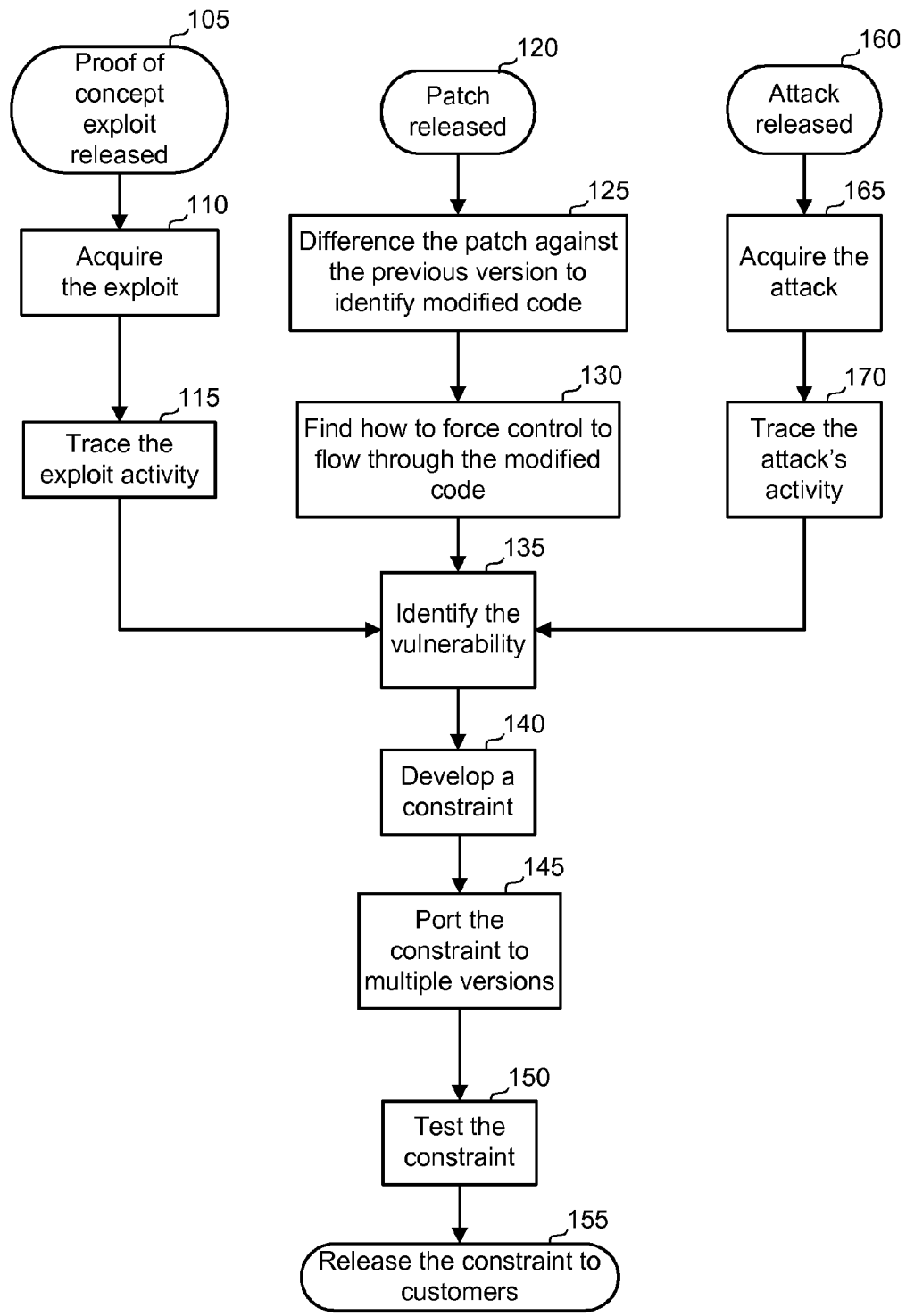
FIG. 1 illustrates processes for developing a constraint.

While a constraint injection system can be applied to many problems, as described in section 3, one of the main applications is protecting vulnerabilities of a computer program. Most vulnerabilities are corner cases that should never happen in normal operation of the software. A corner case is a problem or situation that occurs only outside of normal operating parameters—especially one that manifests itself when multiple environmental variables or conditions are simultaneously at extreme levels. They usually result from a developer failing to account for that case when writing the software code. Corner cases result in vulnerabilities than can be exploited to carry out actions that should not be allowed under the normal operating assumptions of the program.

For most vulnerabilities, a simple check, such as a few instructions, e.g., assembly instructions, carried out at the right point of the program execution, is sufficient to detect the corner case. For example, such a check may determine if a value is out of range or if certain patterns are present in a string. These checks don't detect the corner cases in normal operations. When the check, inserted in the program, detects the invocation of the corner case, a simple remediation such as returning an error code, changing an out of range data value so that it is in range, truncating a string, or changing the control flow of the program, is sufficient to avoid exploitation of the vulnerability. Hard issues in dynamic program upgrades such as state changes or data structure changes are typically not required in checking and remediation of a vulnerability.

2. A Constraint Injection System

We introduce a technique that can provide immunization against program vulnerabilities. As previously mentioned, the exploitation of a vulnerability can be avoided by inserting a simple check and remediation code into an existing application program. A constraint injection system is a system that allows insertion/injection of one or more code segments (constraints) into an application for this purpose. In particular, a constraint can include detector code, which determines when a corner case is invoked, and remediator code, which takes remediation action once the corner case is detected.

Generally, a constraint has a designated application, and each constraint addresses one vulnerability. Usually, a constraint targets a particular address in the application where it is inserted. This location is designated by the constraint developer. Once injected, it is triggered by control flowing through the patch point.

Within the application, specific components such as a library component and an executable component are named. For example, with Microsoft Windows®, a Dynamic Link Library (DLL) and an Executable (.EXE) file are named. Generally, any type of library and executable can be provided for use with any system, including Unix and others. The application and components are identified by a version number and a hash. Filtering criteria can be used to identify the applicability of a constraint.

The following is a set of attributes present in some of the possible manifestations of a constraint injection system:

2a. Stable

The constraint injection system is stable by itself, and the system or the constraints within the system introduce only minimal disruptions to the system, helping to increase the overall availability of the system.

2b. Secure

The constraint injection system does not introduce any new exploitable attack vectors to the system. All communication and constraints are checked and verified for authenticity.

2c. Comprehensive

Most constraint implementations provide the ability to inject an arbitrary piece of code into an arbitrary point in the application code. This is an extremely powerful tool which has the ability to identify and fix most problems in a program, as there are no restrictions in the ability to modify the program.

2d. Dynamic

In implementations where the constraints are injected into application memory, a new constraint can be inserted into a running application, e.g., dynamically. In most implementations, it is possible to turn a constraint on and off dynamically as the application is running. It is also possible to toggle any customer-visible switches, such as toggling between detection and protection mode dynamically.

2e. Removable

In most implementations, it is possible to remove the constraint from a running application.

2f. Minimal

It is possible to create a constraint to addresses a single vulnerability. Thus, a typical constraint should have minimal impact on the overall system. A collection of constraints protects the system against known vulnerabilities.

2g. Customer-Visible

The status and statistics of constraints can be made customer visible. For example, each constraint can have a customer-friendly description. Constraints can be maintained as customer-visible databases. Furthermore, the customer can control individual constraints, such as turning them on or off, and setting detector or protector modes. The customer can observe the behavior of active constraints, such as the number of invocations of the detector, the number of triggerings of the remediator, the number of errors, remediation action taken, and a current state such as on or off, or detector or protector mode. The ability to create a debug log with customer-visible debug settings to understand false positives and errors can also be provided. The status of the constraint can indicate if it is on or off, if it is applicable in a system and if it is active or passive. The system can also gather statistics about the effectiveness of the constraint such as how many times the constraint was invoked.

3. Problems Addressed by Constraint Injection

A constraint injection system is a flexible system that is not limited to solving program vulnerability problems. This section describes this and other possible applications of a constraint injection system.

3a. Patching a Vulnerability

A primary goal of a constraint injection system is to protect software systems against known vulnerabilities. Since vulnerabilities are known before most of the attacks against them are released, protecting against the vulnerabilities in a timely manner provides a proactive Intrusion Prevention System (IPS).

3b. Protecting Against an Attack

As with patching a vulnerability, a constraint can be created against a known attack. In particular, by analyzing the attack to understand how it deviates from the normal program behavior, a constraint can be crafted to check and stop that deviation.

3c. Fixing a Program Bug

Since a constraint has the ability to change an arbitrary piece of code in an application, it can be used to fix many other classes of bugs that do not lead to a vulnerability.

3d. Filtering Content

A constraint can monitor data flowing within an application and search and filter the data. This can be achieved by inserting a constraint that gets executed with the movement of data.

3e. Enforcing a Security Policy

A constraint can enforce a security policy in an application, such as by restricting the existing functionality of the application. A constraint can insert code to limit, bypass or disable a specific feature.

3f. Extending the Application Functionality

As a corollary to security policy enforcement, a constraint can be used to extend and enhance the functionality of an application.

3g. Monitoring the Application Behavior

A constraint can be used to monitor certain program behavior by inserting checks on the control flow path pertaining to that behavior, and reporting relevant results to a monitoring system outside the program. This can also be used to monitor system and application performance, stability and availability.

4. Constraint Injection System Overview

A constraint injection system can span three domains: creation; management; and deployment. Most constraints are created at the security laboratories of a constraint vendor, an Intrusion Prevention System (IPS) vendor, an Independent Software Vendor (ISV), an Original Equipment Manufacturer (OEM) vendor which developed the application which is to be protected, or a third party security professional. The constraints can be managed and administered by an Enterprise Network Operations Center (NOC) of a customer of the constraint injection system. The NOC is typically a physical space from which a large telecommunications network is managed, monitored and supervised. Finally, the constraints are deployed at the hosts in the enterprise.

Primary types of constraints include: 1) constraints targeting a known vulnerability, attack or a program bug, 2) general constraints that can address a wide range of problems or enforce lockdowns or other policies (these constraints may require configuration, tuning or training), and 3) built-in constraints delivered with the constraint injection system that protect against known vulnerabilities and enforce accepted policies. The functionality of the constraint injection system can be understood further in view of the following description.

FIG. 1 illustrates processes for developing a constraint. One path begins when a proof of concept exploit is released (step 105) by a researcher, for instance. A proof of concept exploit provides evidence that a particular vulnerability exists in software, and demonstrates that an exploit is feasible. However, the proof of concept can be used as a road map by attackers to build an attack. At step 110, the exploit code is acquired, such as by a security laboratory, and the exploit activity is traced (step 115) using tools to analyze the exploit and its manifestation during an attack. A trace is a detailed record of the steps a computer program executes. Subsequently, the vulnerability is identified (step 135).

In a second possible path, a security patch is released (step 120). For example, an OEM software vendor such as Microsoft Corp. periodically releases security patches in response to discovered vulnerabilities. The patch is differenced against the original module to identify the modified code (step 125). Then, the security laboratory determines how to force the program to execute the modified code, e.g., by applying the correct input sequence or other another appropriate tool (step 130). Subsequently, the vulnerability is identified (step 135).

In a third path, when an attack is released (step 160), the attack is acquired (step 165) and its activities are traced (step 170) by observing what it does when attacking a controlled, vulnerable system. Subsequently, the vulnerability is identified (step 135). Typically, when an attack is released, news of the release is publicized as a warning to others by customers, software vendors, software security industry groups and sometimes the general news media. In other cases, customers may choose to handle attacks privately to avoid negative publicity.

Thus, in all three paths, after an analysis is performed, the vulnerability is identified (step 135), and a constraint can be developed to detect the vulnerability and remediate against it (step 140). The constraint code can be ported to different versions of the module that is patched (step 145). That is, multiple versions of the same software can exist in deployment. Some of these differences are not customer visible (for example, an earlier patch was applied or not). Each version typically has one or two slightly different files. Thus, a patch should be ported to all the versions of a file that might be running in a customer machine. The constraints are extensively tested (step 150) before being released, e.g., to customers (step 155).

Figure 2:
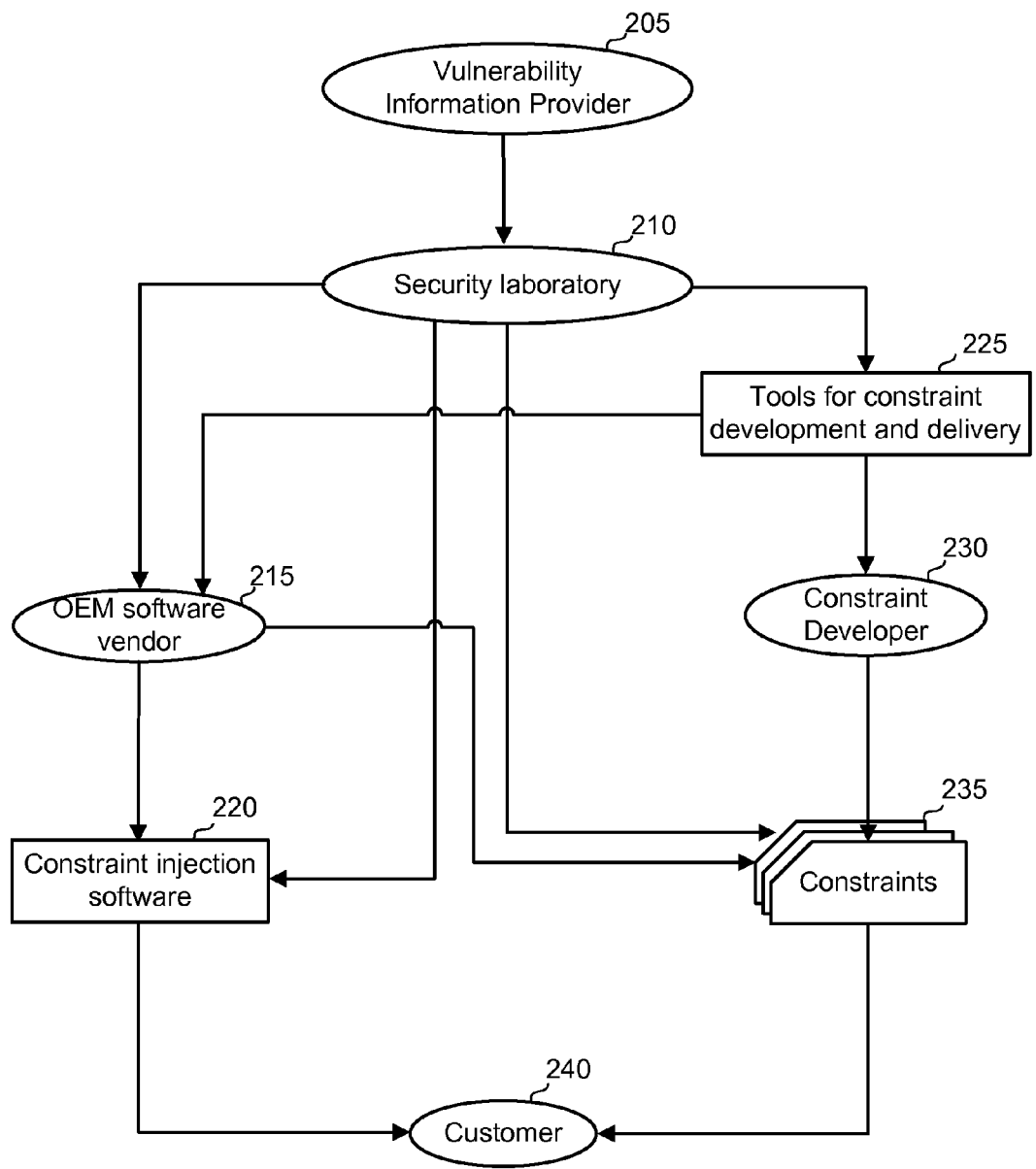
FIG. 2 illustrates processes for deploying a constraint.

FIG. 2 illustrates processes for deploying a constraint. Multiple business models may be employed for providing constraint injection software as well as constraints to a customer 240 to protect customer's software. The constraint injection software provides a framework for using the constraints. In one approach, a security laboratory 210 develops the constraint injection software 220 and delivers it directly to the customer 240. In another approach, the security laboratory 210 develops the constraint injection software 220 and provides it to the OEM software vendor 215, which developed the software used by the customer 240. The OEM software vendor 215, in turn, delivers the constraint injection software 220 to the customer 240.

Delivery of the constraints 235, such as in the form of libraries, can also take multiple paths. For example, the security laboratory 210 can deliver the constraints directly to the customer 240. Or, the security laboratory 210 can deliver the constraints to the OEM software vendor 215 which, in turn, delivers the constraints to the customer 240. In another approach, the security laboratory can provide tools for developing and delivering the constraints 225 to the OEM software vendor 215 or to a constraint developer 230. Either of these entities can use the tools to prepare the constraints 235 and deliver them to the customer 240 as a service. The security laboratory 210 optionally uses the help of a vulnerability information provider 205 in multiple stages of constraint creation to develop the constraints. The vulnerability information provider 205 can be individuals or companies who reverse engineer programs and/or track and analyze the information on vulnerabilities to help the constraint developer 230 create the constraints. The multiple stages of constraint creation generally refer to steps 110, 115 or 125, 130 or 165, and 170 of FIG. 1. Sometimes the vulnerability information provider 205 can also perform steps 135 and part of step 140 to take some of the burden of constraint creation off of the constraint developer 230.

In another approach, the customer itself develops the constraints and/or constraint injection software if it has the available resources.

Figure 3:
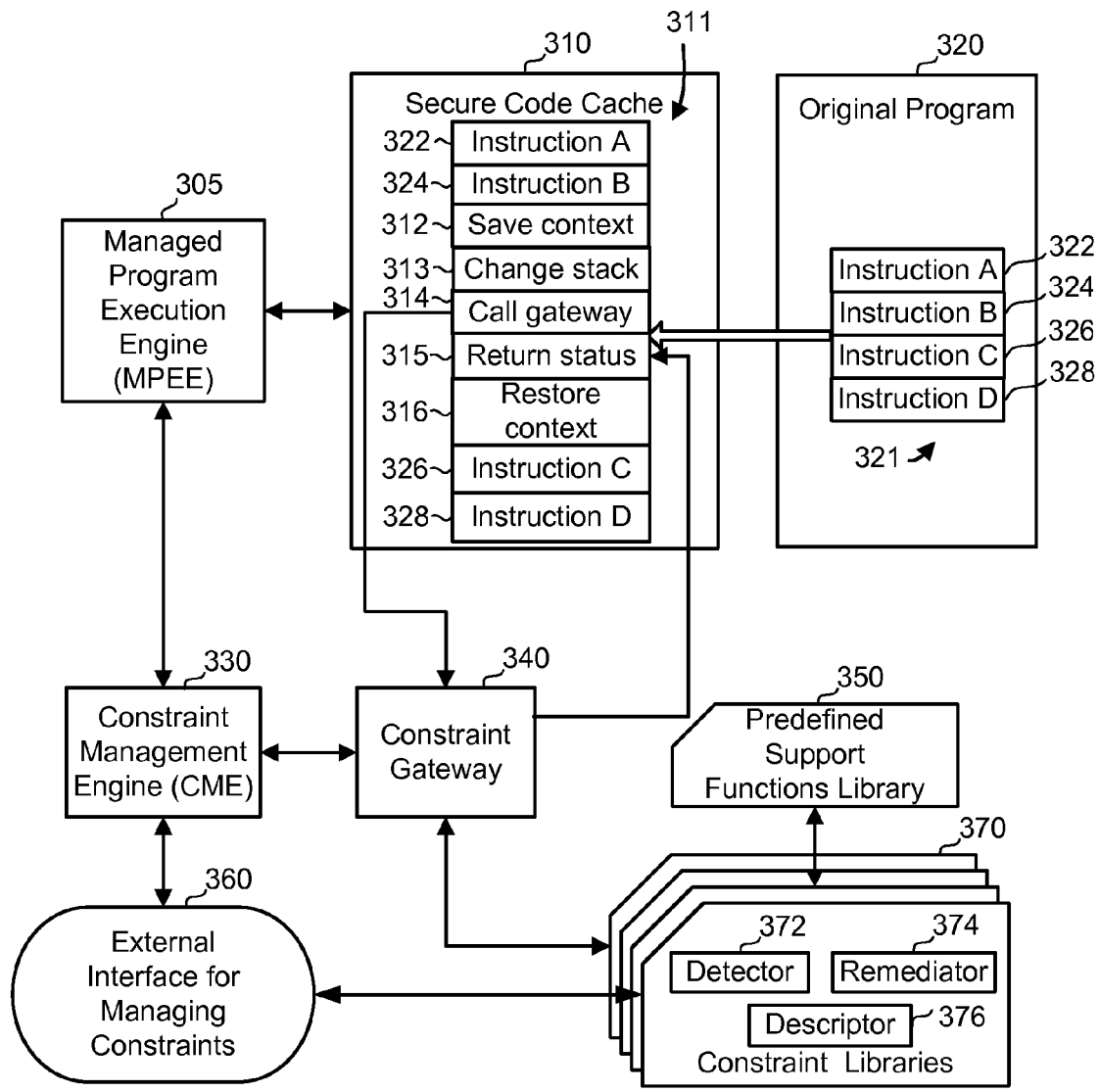
FIG. 3 illustrates a software architecture for deploying a constraint within an application using a code cache.
Figure 4A:
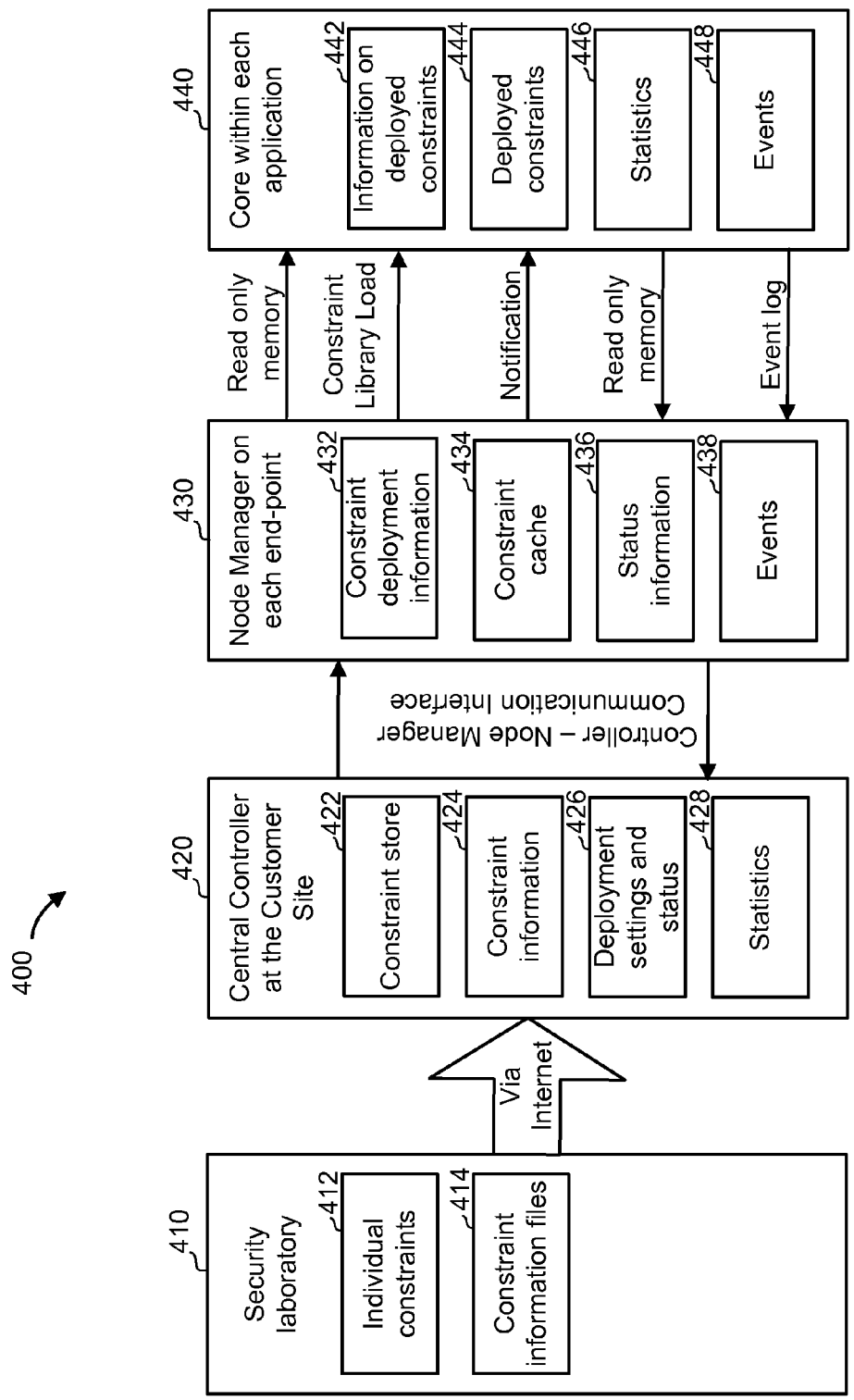
FIG. 4a illustrates an information flow of a constraint injection system.

FIG. 3 illustrates software architecture for deploying a constraint within an application using a code cache. Referring also to FIG. 4a, the constraint injection software can be distributed and installed like a normal enterprise software system. A central controller 420, which is a central management console, is installed at the customer site. The central controller 420 produces installers for all of the nodes, which install a node manager 430 on each node. The node manager 430 inserts the constraint libraries, such as DLLs, into all the applications that are protected. The constraints can be deployed in the manner in which signatures (or DAT files) are deployed in an anti-virus system. FIG. 3 identifies components within a single application (e.g., application core 440). A predefined support functions library 350 represents the new constraints that get deployed similar to the way in which a signature of an anti-virus system is deployed, for instance. A managed program execution engine (MPEE) 305 manages the creation and maintenance of the code cache and grantees that all the instructions executed by the program happen within the code cache. Note that the functionality of MPEE can be used to implement many other capabilities beyond constraint deployment. The constraint specific software is represented by a constraint management engine 330, a constraint gateway 340, the predefined support functions library 350, and an external interface for managing constraints 360. The predefined support functions library 350 supplies the common functions libraries that will be used by the constraints, so those functions don't have to be downloaded with each constraint.

An original, unmodified program, which is to receive the constraint, includes a code fragment 321 which has a number of instructions, e.g., instruction A 322, instruction B 324, instruction C 326 and instruction D 328, for instance. The original program refers to the program as it exists before a constraint is injected to protect against attacks. A Managed Program Execution Engine (MPEE) 305 controls the creation and management of a secure code cache 310. Further details regarding a possible implementation of the secure code cache 310 can be found in U.S. patent application publication no. 2005/0010804, published Jan. 13, 2005, titled "Secure Execution Of A Computer Program Using a Code Cache,", incorporated herein by reference.

The MPEE 305 creates a modified code fragment 311 from the original code fragment 321. In particular, the modified code fragment 321 includes a save context instruction 312, a change stack instruction 313, a call gateway instruction 314, a return status instruction 315, and a restore context instruction 316, which are inserted at a patch point which is between the instruction B 324 and the instruction C 326. Here, we assume a constraint is a single unit that gets inserted into a single location with a single detector/remediator function. However, it is also possible for a constraint to be provided by using a collection of patch points, where each patch point has its own insertion point, detector and/or remediator functions (see FIG. 7). Generally, a constraint can be inserted into any location in an application. The locations need not be predefined.

The specific location for inserting the constraint is specified by the constraint developer. The function of the save context instruction 312 is to save the application context, the function of the change stack instruction 313 is to change the stack from the current stack to the MPEE stack, the function of the return status instruction 315 is to return a status of the detector to the user, the function of the call gateway instruction 314 is to call the constraint gateway 340, and the function of the restore context instruction 316 is to restore the application context. See FIG. 5 for further details. The context is mainly denoted by the registers. Each context will have its own stack. However, the current stack is identified by the stack pointer register, thus, changing the registers will change the stack.

A Constraint Management Engine (CME) 330 coordinates with the MPEE 305 so that when the original code fragment 321 is copied from the original program location 320 into the secure code cache 310, it is correctly modified to reflect the modified code fragment 311. When the control-flow invokes the constraint, it calls the constraint gateway 340. In particular, when the control flow passes through the modified fragment 311, the call gateway instruction 314 calls the constraint gateway 340. The constraint gateway 340, using a deployment status given by the constraint management system 330, calls the appropriate one or more constraints in constraint libraries 370. More than one constraint can be attached to the same instruction. The constraint libraries 370 include a detector 372 and a remediator 374, which in turn may call a set of predefined functions from a predefined functions library 350. See section 19. The predefined functions may include, e.g., string copy, string compare, and other functions that multiple constraints may use. The constraint libraries 370 also include a constraint descriptor 376, discussed below in section 9. The constraint gateway 340 subsequently makes a call return to the code fragment 311, such as to the return status instruction 315.

The detector 372 determines whether the modified fragment 311 is attempting to invoke the vulnerability, in which case that fact is reported and the remediator 374 is called. The detector 372 should have no adverse impact on the program, such as changing the program state. That is, the detector code should not modify any program visible memory or program registers, acquire program visible resources, modify program control flow, or crash and hang the system. Exception conditions should be caught, and checks should be made for infinite loops. If a problem is encountered, the constraint can be exited. For recurring problems, the constraint can be disabled.

The remediator 374 has the ability to change the application to fix a vulnerability, such as by changing any application visible memory location, or changing control flow of the program, e.g., by returning from the current application function or jumping over a few application instructions after a trampoline. A trampoline is a small piece of code that is created at run time, mainly in the stack. This code is generated to help the program transfer control from one place to another. The original code transfers control to the trampoline code, which will then transfer control to the destination. There are multiple uses for trampolines. For example, when the destination is not known at compile-time, the trampoline can do the control transfer without patching the binary. When the type of the branch is not known (short or long), the trampoline can help insert a variable-sized instruction. Trampolines can also be used to handle long branches.

Allowed program level remediation action can also be taken, such as killing a thread and/or process and throwing an exception. The remediator code should change the program behavior only minimally to the extent needed to stop an attack.

The constraint management engine 330 coordinates with the outside world via an external interface for managing constraints 360, e.g., to set the deployment state of the constraints as well as to load new constraint libraries. For example, the external interface 360 can communicate with the central controller 420 via the node manager 430.

The constraint system can be implemented on the Microsoft® Internet Security and Acceleration (ISA) Server, in one possible implementation.

FIG. 4a illustrates an information flow of a constraint injection system. The constraints can be developed by an authorized security laboratory 410, for instance. In particular, individual constraints 412 and constraint information files 414, which together make up the constraints (e.g., constraint 235 in FIG. 2), can be developed. Additional details regarding constraints are discussed further below. When a new constraint is required, it is developed and made available to users. The security laboratory 410 can deliver a constraint to the customer's Enterprise Network Operating Center (NOC) such as by downloading the constraint to a central controller 420 at the customer site. The central controller 420 manages the constraints and deploys them to end-points, e.g., servers, user desktops or other computers, at the enterprise. Typically, an enterprise will have a number of servers and host computers such as desktop computers, laptops, mobile devices and the like which enable the enterprise users to run applications which are protected by the constraints. The servers enforce the constraints in the relevant applications. In one approach, the servers may use an infrastructure such as the Memory Firewall™ (SecureCore), available from Determina Corp., Redwood City, Calif., for this purpose.

The servers can also provide information to the central controller 420 regarding stability and possible false-positives, thereby facilitating the deployment and improving the overall availability. When an event is triggered, the server nodes can use intelligence to differentiate a security event from a false positive and also aggregate that information at the central controller 420 to improve the accuracy and inform the system administrator. Furthermore, each server or other endpoint can have a node manager 430 that acts as an intermediary between the central controller 420 and an application core 440 within each individual application.

The central controller 420 stores the constraints in a constraint store 422, and collects information regarding the current status of the constraints in a constraint information module 424. A deployment settings and status module 426 enables an administrator to manage the deployment of the constraints and informs the administrator of the current status. A statistics module 428 collects statistical data regarding the constraints. See section 12 below for further information.

Also, in FIG. 4a, between the node manager 430 and the core 440, the notation "read only memory" denotes the mechanism to pass constraint information from the node manager 430 to the application 440 by sharing a memory page between the two processes, the notation "Constraint Library load" denotes that the node manager 430 loads information from the libraries 350 and 370 of FIG. 3, into the application 440, and the notation "notification" denotes a mechanism that notifies the application 440 that new information is available (for example, this may be implemented using either an interrupt type or polling type mechanism). User preferences for constraint deployment, such as on, off, detect or protect can also be provided in the notification. The notation "read only memory" denotes a shared memory page that communicates current operational characteristics from the application 440 to the node manager 430. For example, status information and statistics related to constraint deployments can be provided. Lastly, the notation "event log" denotes that events generated by the core 440 can be logged at the node manager 430.

Figure 4B:
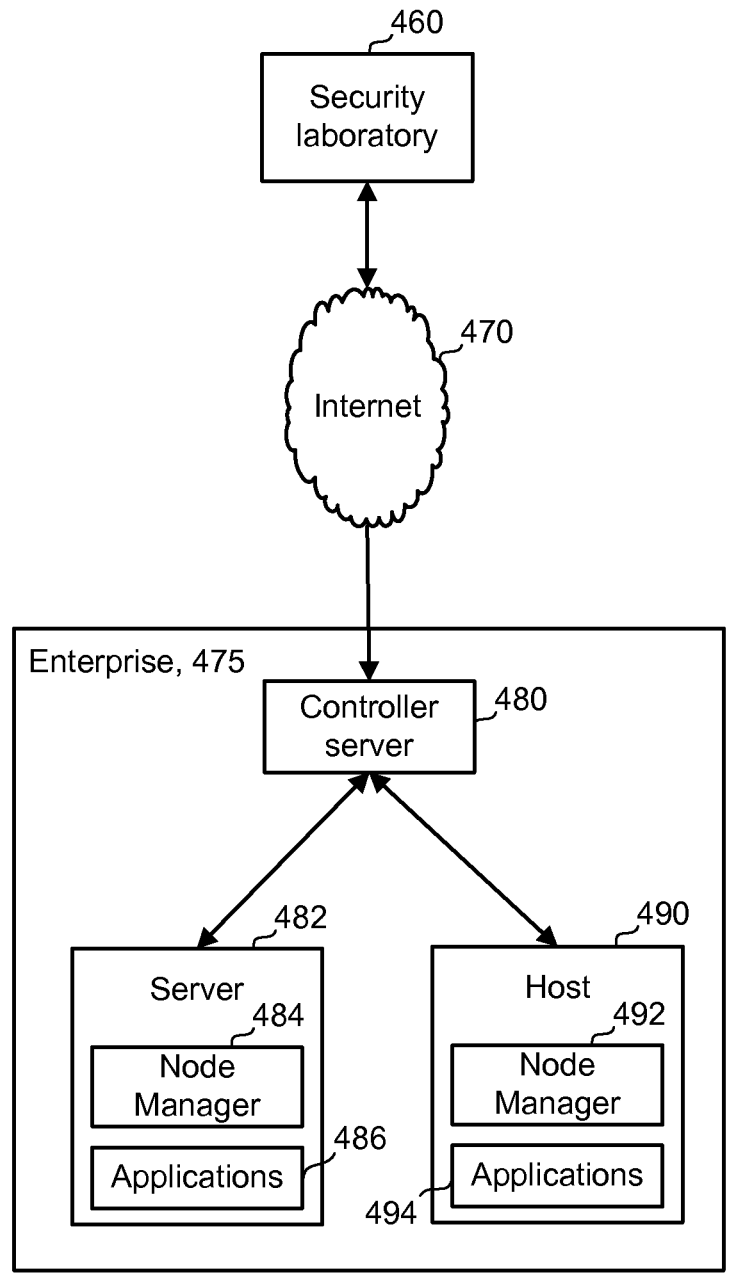
FIG. 4b illustrates a network context in which a constraint injection system is used.

FIG. 4b illustrates a network context in which a constraint injection system is used. In one possible approach, a security laboratory 460 provides the constraint injection software and the constraints to one or more enterprises, such as enterprise 475, via the internet 470 or other WAN or LAN. A controller server 480 in the enterprise 475 provides the constraint injection software and the constraints to one or more servers and/or hosts in the enterprise, such as example server 482 and example host 490. The controller server 480 provides the functions of the central controller 420 in FIG. 4a. The node managers 484 and 492 at the server 482 and host 490, respectively, provide the functions of the node manager 430 of FIG. 4a. The server 483 may be an application server which runs one or more applications 486 or other computer programs, while the host 490 may be a desktop computer, laptop computer, PDA, cell phone or other device which runs one or more applications 494 or other computer programs. The applications 486 and 494 may run entirely locally to the server 482 or host 490, respectively, or may be server-side and client-side portions of a distributed application, in which case the host 490 is a client host of the server 482. The applications 486 and 494 provide the functions of the application core 440 of FIG. 4a.

Figure 5:
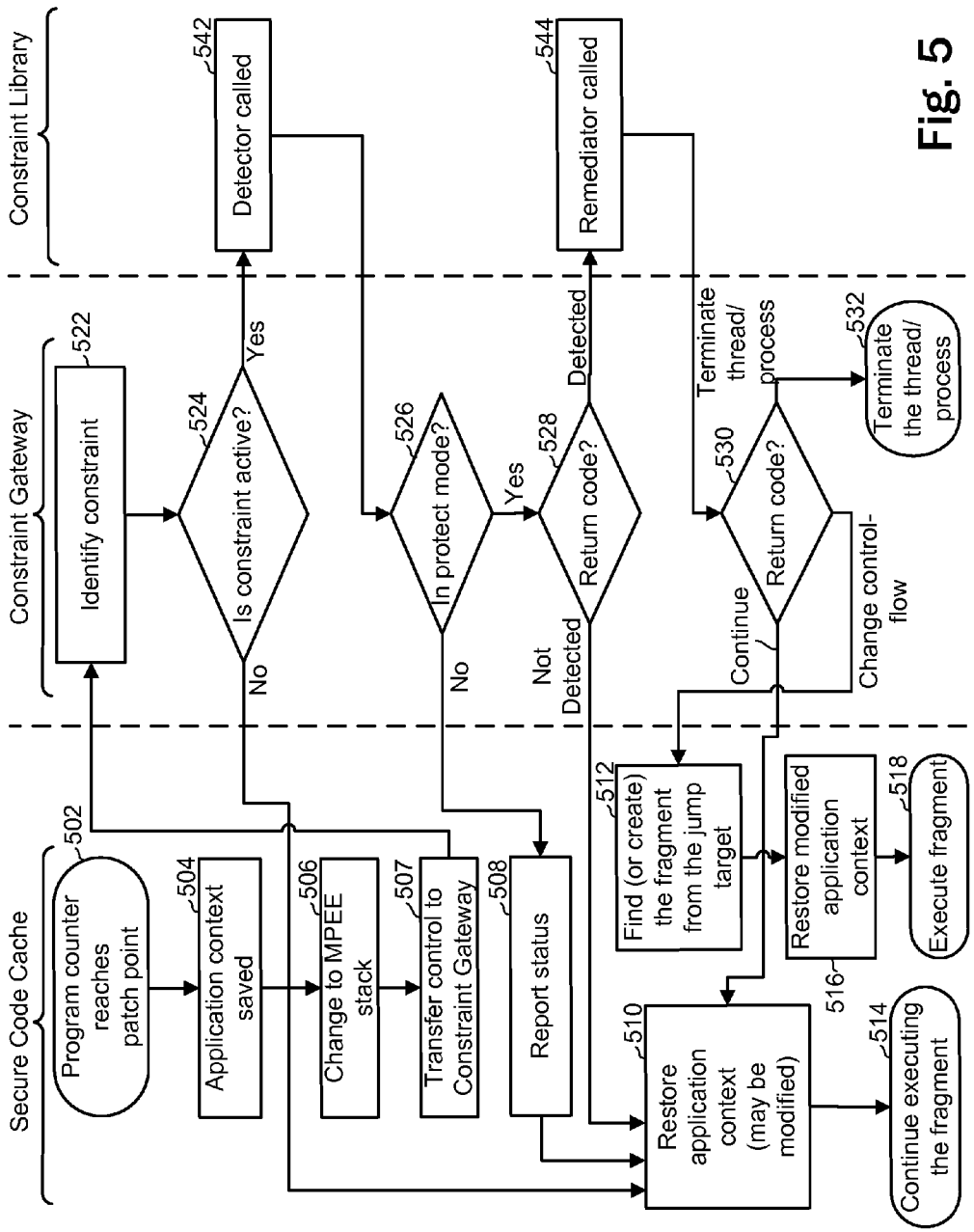
FIG. 5 illustrates a control flow when invoking a deployed constraint.

FIG. 5 illustrates a control flow when invoking a deployed constraint. The control flow is divided into three sections to indicate whether the secure code cache, the constraint gateway, or the constraint library is involved. At the secure code cache, the modified fragment (311, FIG. 3) is executed when a program counter reaches the patch point (step 502). The inserted code in the secure code cache saves the application context (step 504), changes the stack to the MPEE's stack (step 506) and calls the constraint gateway to transfer control to the gateway (step 507).

The constraint gateway identifies the constraint that was executed (step 522). If the constraint is active and selected (decision block 524), the detector in the constraint library is called (step 542). If the current constraint is not in the protect mode, the detector status is returned to the user (step 508), and execution continues at the application code (step 514) after restoring the application context (step 510). Thus, even if the constraint is not deployed in the protector mode, status information, statistics and the like can be reported. If the current constraint is in the protect mode (decision block 526), and if a return code from the detector indicates that remediation is necessary (decision block 528), then the remediator (step 544) is called. Depending on the return code of the remediator (decision block 530), different paths can be taken. In one path, the current thread and/or process is terminated (step 532). In a second path, the control flow is changed to a different application address, in which case the fragment from the jump target is found or created (step 512), the modified application context is restored (step 516) and the fragment is executed (step 518). In a third path, the program continues executing from the point where the constraint was invoked, in which case the application context, which may be modified, is restored (step 510) and the fragment continues executing (step 514).

Figure 6:
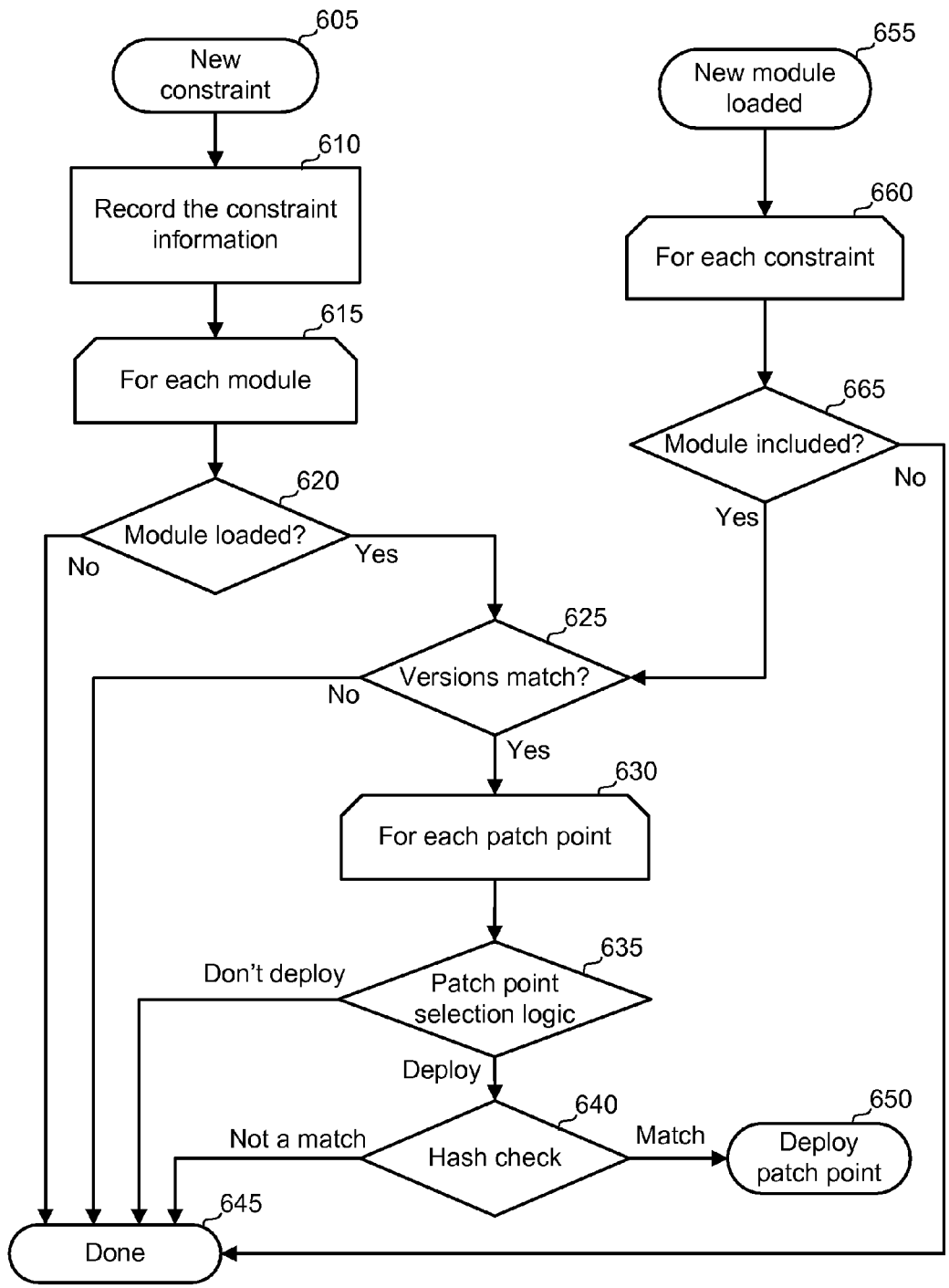
FIG. 6 illustrates a process taken when loading a new constraint or module.

FIG. 6 illustrates a process taken when loading a new constraint or module. Note that a module is a unit of an application, and an application is built out of multiple modules. The executable and each library are modules. FIG. 6 is concerned with the application loading a new library as well as the constraint system getting a new constraint. Referring also to FIG. 3, the instructions 312, 313, 314, 315 and 316 are inserted by the MPEE 305/CME 330. They are not part of the constraint or the application (module). Instructions 322, 324, 326 and 328 are from the application (module).

When a new constraint is loaded (step 605), the information about the constraint is recorded (step 610). Next, for all of the affected applications and the modules within the applications listed in the constraint (step 615), the system checks to see if the application is currently running and the module is currently loaded (decision block 620). Note that step 620 will be invoked multiple times by the step 615—once per module. If the module is loaded, additional checks are carried out. For example, the version of the module in memory can be checked against the version provided (decision block 625). Specifically, when a new module is loaded into memory (step 655), for each constraint (step 660), all the active constraints are queried to see if any of them includes the module being deployed (decision block 665). Thus, at decision block 625, the version of the provided module can be compared to the version of the module in memory. If all the checks pass, then, for each patch point in the module (step 630), patch point selection logic is executed (decision block 635). The patch point selection logic relates to matching the constraint application policy (Section 11, below). If the patch point selection logic selects deployment, a hash of the program bits around the patch point is calculated and compared to the provided hash in a hash check (decision block 640). If the hash check indicates a match, the patch point is deployed (step 650).

The process is completed (step 645) when the module is not loaded (decision block 620), the module versions do not match (decision block 625), the patch point selection logic does not select deployment (decision block 635), or the hash check does not indicate a match (decision block 640).

Figure 7:
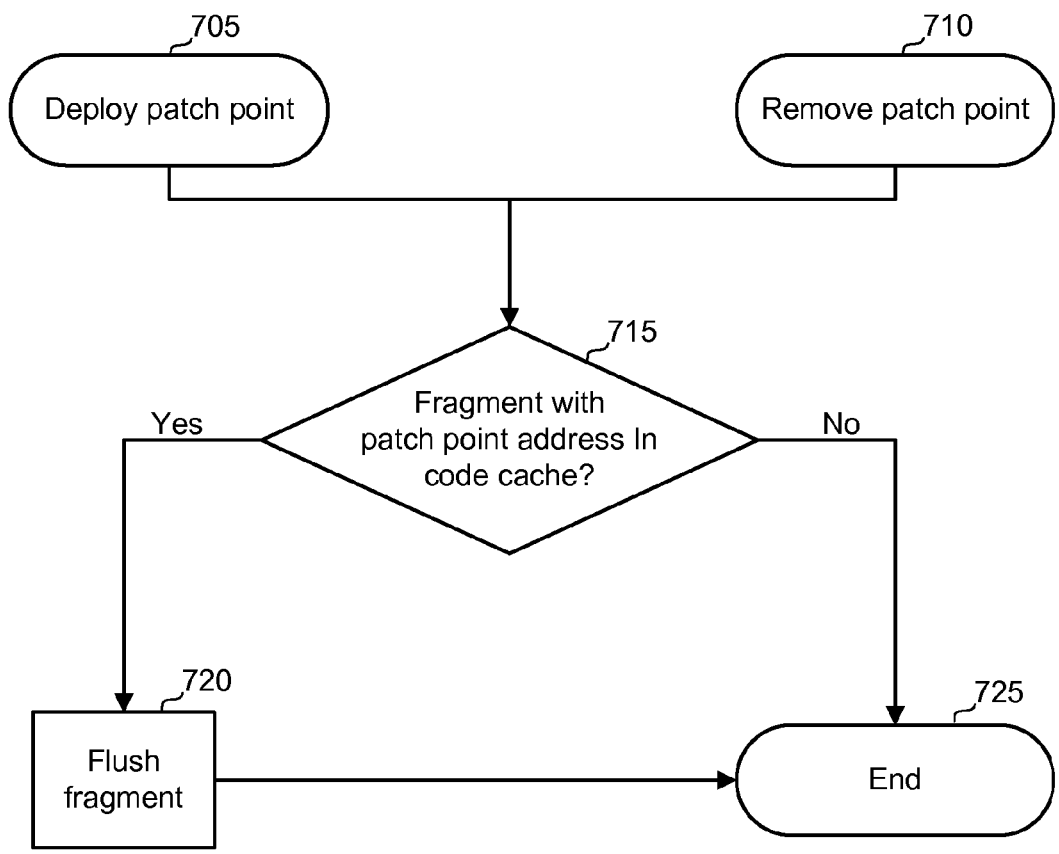
FIG. 7 illustrates a process taken when deploying or removing a patch point.

FIG. 7 illustrates a process taken when deploying a patch point (step 705) or removing a patch point (step 710). Normally, a constraint can have a collection of patch points. Each patch point has its own insertion point, detector and remediator function. A constraint can also involve only one patch point, as discussed previously. In either case, i.e., deploying or removing a patch point, if a code fragment that includes the patch point is currently in the secure code cache (decision block 715), that fragment is flushed from the secure code cache (step 720) and will be rebuilt when needed. Otherwise, the process ends at step 725. In the case of deploying a new patch point, the original code fragment in the secure code cache that did not have a call out to the constraint gateway is replaced by a new fragment that has the necessary callout when that fragment is rebuilt in the code cache. In the case of removing the patch point, the fragment that had the call out is flushed and replaced by a new fragment that does not have the callout when it is rebuilt in the code cache.

Figure 8:
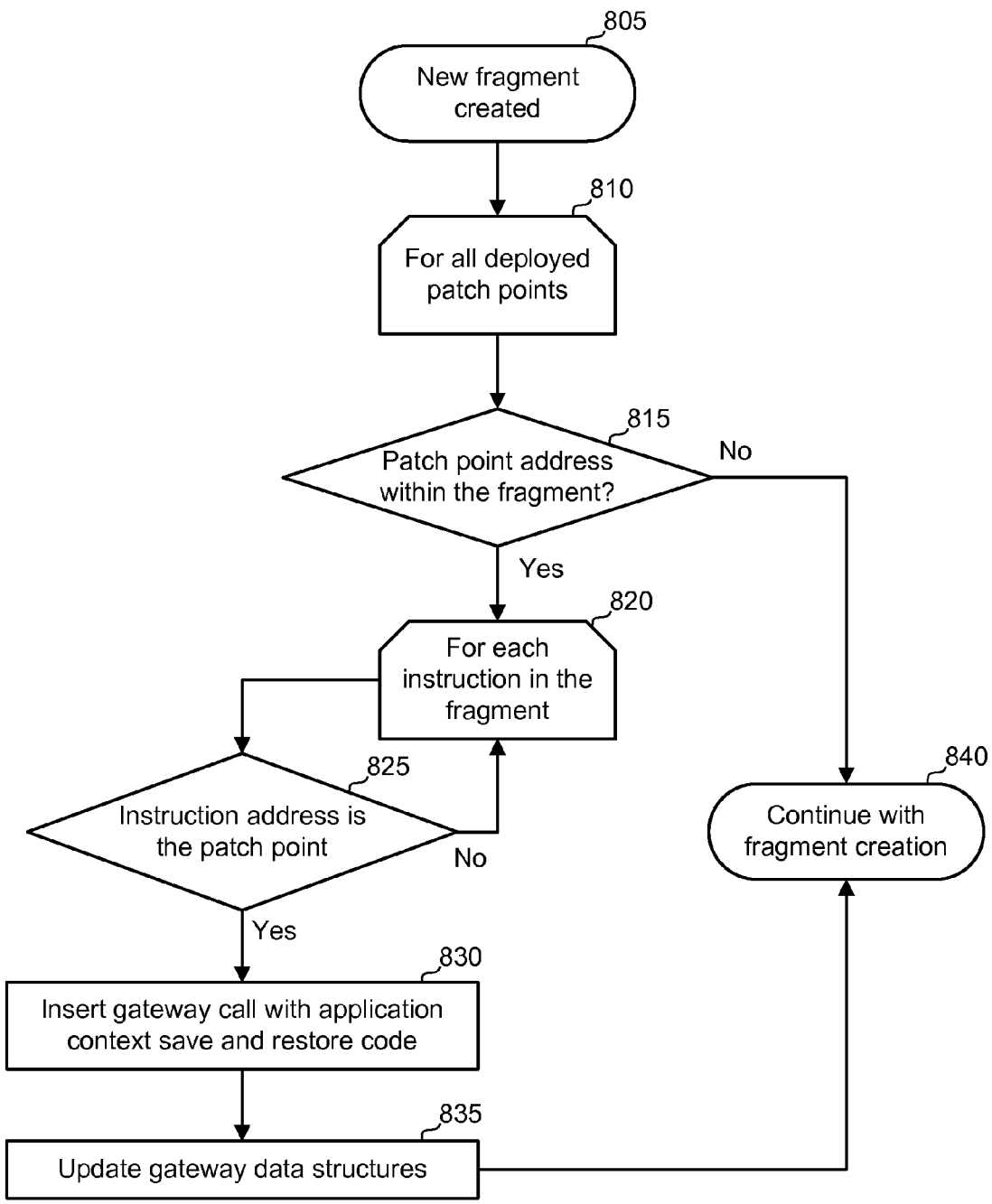
FIG. 8 illustrates a process taken when a new fragment is created.

FIG. 8 illustrates a process taken when a new fragment (such as the fragment 311 in FIG. 3) is created. In particular, the figure describes the actions the MPEE and CME take when a new fragment is created (step 805). For all the active/deployed patch points (step 810), a check is made to determine if the patch address is within the address range of the fragment (decision block 815). If a patch point is found, then, when the fragment instructions are created/copied, each instruction is checked (step 820) to determine if its address is the patch address (decision block 825). At the instruction of the patch address, code is inserted into the fragment to save and restore the application context and call the gateway (step 830). Then, the data structures used by the gateway to identify the patch are updated (step 835), and fragment creation continues (step 840). If a patch point is not found at decision block 815, fragment creation continues (step 840).

5. Constraint Categories

Constraints can be categorized by their interactions with the end-user or the system administrator at the enterprise.

5a. Black-Box Constraints

The constraint developer has the option of providing a constraint as a black box constraint. Black box constraints do not allow the customer any per-constraint configurability. The only option the customer has is to decide where to deploy the constraint. However, the constraint injection system may provide generic options for all constraints, such as the ability to deploy in Intrusion Detection System (IDS) or Intrusion Prevention System (IPS) modes. In the IDS mode, or detect mode, intrusions are detected, but preventative action is not taken, while in the IPS mode, or protect mode, preventative action is taken, in addition to the detection. The IDS mode thus can indicate the risk of user/application interference before the constraint is enabled. Most constraints against vulnerabilities, attacks and bugs can meet the customer's need while minimizing complexity when provided as black-box constraints.

5b. Parameter-Exposed Constraints

The user can supply a set of arguments (or parameters) to the constraint to tune the constraint. Further, a constraint can check for broad or generic problems. Such constraints may need to be tuned to match each application and the deployment scenario. Thus, the constraint can expose a per-constraint interface to the customer. Most policy enforcement constraints fit into this category.

5c. GUI-Exposed Constraints

An advanced form of a parameter-exposed constraint has a Graphical User Interface (GUI) component associated with it. This can be implemented using a simple GUI creation language, an accompanying Java or Active-X component, or any other GUI technology.

5d. Customer-Developed Constraints

Ultimately, an Application Programming Interface (API) for constraint development can be exposed to the customer.

6. Constraint Scope

The scope of a constraint can be unlimited in its ability to insert arbitrary code, or restricted to fit a specific method of program modification such as API interception. API interception refers to capturing the interactions between an application and an operating system at the API level. This section describes a set of possible scope restrictions, as well as a detector and remediator model.

6a. Arbitrary Code Block Injection

A constraint injection system has the ability to inject a constraint in the form of a small block of assembly code into a program. This provides the ultimate power to the constraint, as it provides the ability to monitor or change the program's behavior without restrictions.

6b. Restricted Code Block Injection

The assembly code injection can be restricted according to one or more Application Binary Interfaces (ABIs). An ABI is a set of rules the code in the detector and the remediator has to follow. The ABI rules for the detector and the remediator are different. An ABI describes the low-level interface between an application program and the operating system, between an application and its libraries, or between component parts of the application. An ABI allows compiled object code to function without changes on any system using a compatible ABI. The ABI can be tailored to support all the necessary functionality while disallowing any extra power that can negatively impact the application. For example, an ABI for constraints used for data collection will not allow any modifications to the application state or any application control transfer.

6c. Detector and Remediator Code Block Injection

Constraints for vulnerabilities can be developed within a detector/remediator paradigm since most vulnerabilities are due to a corner case that should never occur in normal operation. As discussed previously, the detector checks for the occurrence of the corner case and the remediator takes the necessary remediation action when the corner case is detected. Thus, the detector can follow a very restrictive ABI so that it can provide a strong guarantee that it will not change the normal program behavior. This can be achieved by restricting the detector so that it cannot change normal program state, including:

Cannot modify any program-visible memory or program registers

Cannot acquire program-visible resources

Cannot modify the control flow of the program

Cannot crash or hang the program

This can be achieved by catching any exception condition and by checking for infinite loops.

When the constraint is run in the detect mode, it has no impact on the normal program operation. This is important because some constraints can generate false positives, and remediation action taken as a result of these false positives can impact the normal program behavior. In this mode, the customers can observe and test the constraint for false positives without impacting the application.

The remediator has the ability to modify the program state and change the control flow of the program. However, the ABI for the remediator can also be restricted by providing it with an interface to carry out the remediation action.

Simple constraints (referring to both the detector and the remediator) will be stateless. However, it is possible to extend the constraint injection system such that a constraint can capture, store, modify and share the internal state across time or with other constraints. Constraint-state information should be decoupled from the program state.

6d. Validation Routine for API Interception

As APIs are a publicly visible, thus stable and known, points in a program, they provide a good opportunity for interception. A validation routine can validate the arguments passed in the API call. As all system calls are implemented as an API, API interception is a superset of system-call interception.

The API validators, a type of constraint, are also a small block of assembly code. However, this block has to follow an even more restricted form of the ABI than that followed by general constraints. For example, this code can only access memory that is part of the input data structures for the API. The API validator ABI will provide access to each of the arguments to the API. The data types of the arguments of individual APIs are validated, thus making the allowed accesses more precise and restrictive.

The API validators can also be extended to accommodate simple interceptions similar to input filtering, where, for a given API and an argument, a regular expression is provided to validate the argument.

6e. Regular Expression for Input Filtering

A typical input filter is a regular expression. All inputs to the application (the type of the input is given by the policy) are checked against the regular expression. The alphabet used to build the regular expression can include ASCII and Unicode characters, memory addresses and a set of special terms defined by the API. If needed, a more powerful grammar can be developed to express the input filters.

Each application is analyzed to find appropriate filter points. Filters and filter points are tagged as belonging to one or more categories, as indicated by Table 1. For applications that were not analyzed and tagged, a set of generic rules can be used to identify what to filter and what category each filter point is associated with. Table 1 provides a partial list of possible input point categories.

TABLE 1

| Name: | Category: | Description: |
|---|---|---|
| EI | External Input | All inputs from external sources |
| EIR | External input pre-processed | Inputs as-is (may be encrypted or unexpanded) |
| EIO | External input post-processed | Inputs after expansion, decryption and reassembly |
| EO | External output | Data being sent out of the system |
| FN | File names | Names for files |
| FNR | File names - read | Names for files to read |
| FNW | File names - write | Names for files to write |
| FNC | File names - create | Names for files that will be created |
| FC | File content | Data being read/written to a file |
| FCR | File content - read | Data that is read from a file |
| FCW | File content - write | Data that is written to a file |
| CS | Command string | Shell commands that are executed |

Two types of monitors for input selection can be used:

1. Generic Monitors—using the Microsoft Windows® API, for instance, special API interceptors can be created as generic selectors that can be applied to any program.

2. Custom Monitors—with the full knowledge of a given program, a specific interception point can be monitored for input filtering.

7. Constraint Patch Point Identification

It is important to precisely describe where to insert the constraint in the application code. As the application code is executed, when the control flow passes over the patch point, the constraint will be invoked. This section describes possible patch points for constraints.

7a. Address Offset

When a constraint is inserted into a known module (e.g., an executable or a library), an offset from the starting address of the module can be provided to indicate the patch point.

7b. Absolute Address

If the module is guaranteed not to be relocated by the loader, the absolute address can be used to describe the patch point.

7c. Symbolic Offset

In order to support multiple versions of a module that may be slightly different, a symbolic address with an offset can be provided to describe the patch point. The constraint injection system can resolve the symbolic address and add the offset to determine the actual insertion point.

7d. API Interception Hook

To describe a constraint at an API function provided by the operating system or the common libraries, the name of the function can be used. Thus, the constraint can be applicable across multiple major and minor versions of the library. Furthermore, a constraint can be created without having access to the application.

7e. System Call Hook

Constraints can be inserted before and/or after a system call. System calls can be identified by the special machine instruction that performs the kernel transfer. Some operating systems such as Microsoft Windows® renumber system calls between versions, in which case a table that maps the system call to the call number according to the Operating System (OS) version can be used to allow the system call identification to work across multiple OS versions.

7f. Code Pattern Match Hook

Instead of identifying a location, the constraint injection system can check for a particular collection of instructions to identify where to insert a constraint. A simple search involves matching an exact code sequence. However, this search can be complex. For example, regular expression matching may be used.

7g. Multi-Mode

A multiple mode system uses criteria such as a symbolic offset or system call to identify a general region, and then searches that area to find a code pattern to locate the exact patch point. There are other possible combinations for multi-mode selection. The address calculation can also include more complex algorithms.

8. Constraint Injection Methods

An important aspect of a constraint injection system is the method used to inject the constraint into the application code. Some of the injection methods only provide a partial set of desired attributes of a constraint injection system. This section describes a few possible injection methods.

8a. Trampoline Method

The constraint can be invoked by inserting a trampoline, or short section of code, into the given location of the memory image of the application module. Since this insertion should occur concurrently with other active threads, the trampoline insertion has to be atomic. Furthermore, it can overwrite an instruction at a valid instruction boundary. These limitations impose restrictions on where trampolines can be installed and the type of instruction that can be inserted. It may be necessary to have a short jump to a nearby location before transferring control into the constraint code block.

8b. Code Cache Method

This method, discussed previously in connection with FIG. 3, involves a system that creates a cache of the instruction blocks of the original program and executes the instructions out of the cache. The Memory Firewall™, available from Determina Corp., Redwood City, Calif., is an example of a system that creates an instruction cache. However, other approaches may be used as well. Since the instruction cache remaps the address space and provides an application-transparent translation from the original address to the cache address, it is possible to change the shape of the instruction block. Thus, it is possible to insert multiple instructions into a program instruction block by expanding the block in cache. Furthermore, the MPEE 305 (FIG. 3), which provides a cache management system, can provide synchronization between multiple threads so that the code insertion does not need to be atomic, allowing the insertion of multiple instructions. This provides a flexible framework for constraint injection. When a code block is copied to the code cache, the constraint injection system can check to see if an active constraint is designated to be inserted into that block. If an active constraint is so designated, the constraint injection system can rewrite the block with the constraint code or insert a call to the constraint code. If a new constraint arrived while the application is running and the insertion point is already in the code cache, that cache block can be flushed and recreated with the constraint inserted. The recreation can occur immediately or lazily when the program counter is transferred to that block next time.

8c. Binary Rewrite Method

In this method, the executable or the library can be modified offline to insert the constraint, e.g., by inserting a trampoline or rearranging the code. The constraint can be in-lined, or a constraint function can be added to the module. Note that this method is unable to provide dynamic injection of constraints.

8d. Object Code Rewrite Method

In this method, the modification occurs in the program development tool chain. This can occur at many points, such as at the compiler, assembler, or the linker.

8e. Byte Code Modification Method

This method is applied when the program is released as byte code, and can rewrite the byte code to include the constraints by the loader, execute the constraints in the interpreter, or insert the constraints in the Just In-Time compiler when the byte code is translated into machine code.

8f. Application/System Defined Interception Point Method

Operating systems and complex applications provide APIs for inserting functionality for monitoring or changing the application behavior. In this method, an application or operating system-specific constraint injection system can be created using one of these APIs provided by the application or the OS. The constraint will get invoked when the underlying application or the operating system calls the API. However, such a system cannot support insertion at any arbitrary point in the application.

8g. Loader Rewrite Method

When a module is loaded into the memory space, the loader can scan the module and insert any applicable constraint. This can be done either by inserting a trampoline or inlining the constraint by rearranging the code in the module. However, the loader method cannot support dynamic insertion after the library or the executable is loaded.

8h. System Call Shim Method

In this method, a limited form of constraint that allows the monitoring of system calls can be implemented using a system call shim either from within the user space or the kernel space.

9. Constraint Descriptor

The constraint descriptor 376 (FIG. 3) provides a description associated with each constraint that helps the constraint injection system decide when, where and how to apply the constraint. There are many variations of constraint descriptors possible. Two example instantiations of a constraint descriptor are provided below. In particular, Table 2 provides a basic constraint descriptor, while Table 3 provides an extended constraint descriptor.

9a. Basic Constraint Descriptor

Table 2 depicts an instance of a descriptor provided by each constraint. The example is geared toward use with Microsoft Windows®, but is generally applicable. One possible representation uses an extensible markup language (XML) file. The constraints may use this descriptor, in one approach.

TABLE 2

| Descriptor: | Definition/Comment: |
|---|---|
| xml_file_version | XML file version. |
| xml_file_timestamp | The timestamp of the creation of the XML file. |
| xml_file_signature | Signature generated using a private key; used to verify XML integrity at the customer site by the management console. |
| constraint_injection_engine_version+ | Version of the constraint injection system. |
| policy+ | Customer visible unit size. This is the level at which the customer configures and views results. A policy defines the attributes and constraints for a single vulnerability announcement (e.g., security bulletin), say Microsoft's MS-2004-0120. However, such an announcement can have more than one vulnerability fixed, so a policy can address more than one vulnerability. |
| policy_id | Unique positive integer identifying a policy. Same if a new version is released to replace an old one. |
| Name | A string name for the policy. Visible to the customer. |
| Description | Comment string describing the policy. Visible to the customer. |

TABLE 2-continued

| Descriptor: | Definition/Comment: |
|---|---|
| external_id | Either a Common Vulnerabilities and Exposures (CVE ®) #, a Candidate (CAN) CVE # such as a Microsoft CAN #, or something else that identifies the patch by an external source. |
| Version | Mainly for the management console to filter among different versions of the same constraint and send only the latest version to the core. |
| policy_class | One of:<br>VULNERABILITY - Protects against a known vulnerability. Typically start with the detect mode.<br>ATTACK - Protects against a known attack. Preferably put into protect mode directly.<br>LOCKDOWN - Enforces a system lockdown. As this is optional and requires customer interaction, it should be in off or detect mode by default.<br>MONITOR - Monitor specified activity in an application. This can be used to help an external event correlator. Here, the remediator should have the properties of the detector, i.e. not modify the application. It should issue a message that can get aggregated by an event correlator. Thus, can start in off or protect mode. |
| constraint_dll | Base name of constraint DLL or other library without path. Core assumes all DLLs will be in a DLL cache managed by Central Controller e.g., in a single directory. |
| constraint_dll_hash | Hash value used by core to verify that "constraint_dll" hasn't been tampered with. |
| os_major* ("*" indicates that the term will appear zero, one or many times) | Specifies the operating system for which the policy is applicable, e.g., Windows ® 2000, 2003 or XP. Only for filtering by the management console and customer visibility; not for core. |
| os_servicepatck* | The service pack number of the operating system. |
| os_patch* | The patch level of the operating system. |
| executable_list* | A list of executable names, no paths; only for filtering by the management console and node manager, and for customer visibility; not used by core; empty means applicable to any executable using the DLLs involved. |
| Timestamp | Creation timestamp for the policy. |
| Mode | Default mode of application for this policy. Can be detect, protect or off. |
| constraint_reset_function | Symbol or offset from the base address of the function in "constraint_dll" that will be called to init/reset state at injection, flush and exception-abort time. |
| vulnerability+ ("+" indicates that the term will appear one or many times) | Each "vulnerability" defines the constraint for one vulnerability in the policy. If a "policy" intends to handle more than one vulnerability, then there should be a "vulnerability" for each. This is not visible to the customer, only "external_id" is; it used for internal tracking. The reason this is invisible to the customer is that they only see, e.g., MS-####-####, not all the vulnerabilities fixed by it. |
| vulnerability_id | A unique positive integer that identifies the vulnerability. |
| Description | Comment string describing the "component" and the constraint for it. |
| set+ | Each "set" defines all the modules affected by a vulnerability and the corresponding constraint. "Sets" are used to handle different versions of one or more modules that may have the same vulnerability that need to be patched. This done by defining a different "set" for each set of module versions requiring a patch. Only one "set" should be applicable for a given process, i.e., "sets" are mutually exclusive. |
| module+ | Defines the module to be patched, its characteristics, patch points and constraint code. |
| pe_name | Used to identify the module to be patched. A value must be specified even if it is "". |
| Pe_checksum | Used to identify the module to be patched. A value must be specified even if it is "". Must specify even if zero, e.g., whatever is in the portable executable (PE) or other executable file. |
| pe_timestamp | Used to identify the module to be patched. A value must be specified even if it is "". Must specify even if zero, e.g., whatever is in the portable executable (PE) or other executable file. |
| pe_size | Used to identify the module to be patched. A value must be specified even if it is "". Must specify even if zero, e.g., whatever is in the portable executable (PE) or other executable file. |
| hash+ | Set of hash definitions, one per patch point, used to verify that each patch point is correct. Even if one doesn't match, the PE file is rejected. |
| start_addr | Offset, from the base address, from which the hash is to be computed. |
| Length | Number of bytes to be used in the hash computation. |
| hash_value | Hash value to check against. |
| patch_point+ | Defines the offset to be patched and the constraint code for it. |
| offset | Symbol or offset relative to the base address of the module to be patched. |
| detector_fn | Symbol or offset relative to the base address of the constraint DLL which specifies the detector code to call. |
| remediator_fn | Same as the above, but for the remediator. |
| return_addr | Symbol or offset relative to the base address of the module to be patched where control should go to after executing the remediator code, if requested by the remediator. This allows the remediator to change the flow of the application's execution. |
| precedence | A global rank to decide which constraint code gets injected first if two of them have to be injected at the same "offset". |

9b. Extending the Constraint Descriptor

The following fields (Table 3) can be use to supplement or replace the fields in the basic descriptor (Table 2) to provide a more extensive form of a constraint descriptor.

TABLE 3

| Name | Type | Description |
|---|---|---|
| Unique ID | Num1.Num2.Num3 | Num 1 - Unique number of the originator<br>Num 2 - A unique assigned number by the originator<br>Num 3 - the year |
| Type | POL | Policy constraint |
|  | GEN | A general constraint that protects against a class of attacks |
|  | VUL | A constraint against a known vulnerability |
|  | ATT | A constraint against a known attack |
| Constraint Type | CODEBLK | A general constraint with a code block |
|  | SYSCALL | An API interceptor |
|  | INPTFIL | An input filter |
|  | INPTMONC | A monitor code that intercepts a known specific input point and extracts the input for input filtering. Interfaces with the runtime system. |
|  | INPTMONG | A monitor code that uses API interception to intercept A generic input point for input filtering. Interfaces with the runtime system. |
| Originator - Major | Short String | Name of the originator/creator of the constraint |
| Originator - Minor | Short String (optional) | Some descriptive information about originator within the organization |
| Confidence | Number between 0 and 15 | Provides originator's confidence on lack of false positives.<br>0 - can have false positives<br>15 - cannot have false positives |
| Importance | Number between 0 and 15 | Originator's estimate on how important this constraint is.<br>0 - optional constraint, not that important<br>15 - critical constraint, extremely important |
| Invalidates | A list of unique IDs (optional) | Constraints that are superseded by this constraint |
| Requires | A list of unique IDs (optional) | Constraints that are required in order to deploy this constraint |
| Applies to | List of <nm., ver., info> | Nm. - the name of an executable or a DLL<br>Ver. - the version number, can include "*" in version fields to identify all minor versions<br>Info. - Specific information for different constraint types |
| INFO | CODEBLK | Offset from the beginning of code segment to insert the check |
|  | SYSCALL | The name or number of the syscall to monitor |
|  | INPTFIL | Type of input to filter |
|  | INPTMONG | Type of input available for filtering and API name |
|  | INPTMONC | Type of input available for filtering and offset from the beginning of the code segment to insert the check |

10. Constraint Language

A constraint injection system may require each constraint to provide machine instructions along with the constraint descriptor. This can be either an arbitrary block of instructions or an instruction block that follows a given set of rules, e.g., a restrictive ABI. When a constraint is invoked by the constraint injection system, this code block can be executed. A constraint injection system can support a mix of these languages. Note that, in a detector and remediator based solution, each constraint can carry two code blocks, one for the detector and one for the remediator. A constraint can be implemented using the following techniques.

10a. Function in a Library

When a constraint is injected, a library file such as a DLL can provide the code for the constraint. This library can have an exported function for the constraint, which is called by the constraint injection system. Each library can have functions for multiple constraints. The constraint injection system can support either a single comprehensive library with all the constraints, or multiple libraries, each with only the new constraints.

10b. Machine Instruction Function Object

Instead of relying on the loader to load the constraint function library, the constraint injection system can directly provide the machine code for the constraint function. This information is copied into the program's memory by the constraint injection system. However, the constraint injection system has to resolve the symbols and perform the linking. The linking functionality required is simple since the constraint functions have a very limited ABI. Furthermore, not exposing the constraint functions to the application makes the constraint injection system more transparent. Another issue is relocation of the code. The constraint injection system can either carry out the relocation or demand position-independent code.

10c. Machine Instruction Code Block Insertion

The constraint code, provided as a code block, can be directly inlined into application code at the appropriate locations when the code cache is built. This can lead to better performance when executing constraints.

10d. Machine Instruction Code Block Replacement

This is very similar to machine instruction code block insertion, where instead of inserting a code block, the existing code block is replaced.

10e. Byte Code

Instead of providing machine instructions, a byte code can be used to describe the constraint. When the constraint code has to follow a restricted ABI, the byte code provides a simple way of enforcing that ABI. The byte code should have a simple mapping to the machine instructions.

Table 4 provides an example of a simple constraint byte code format. The byte code can be either a part of the constraint descriptor or a separate file. SP denotes a space.

TABLE 4

| Byte code: | Machine instructions/comments: |
|---|---|
| constraint_code | "[" [SP] <globals> SP <all_cons> [SP] "]" |
| globals | "(" [SP] <num_glob> _[SP] <glob_list> [SP] ")" |
| num_glob | The count of the data units in the glob_list |
| glob_list | <glob_list> [SP] <data> \| <data> ∈ |
| data | "<" [SP] <num_bytes> [SP] ">" \|<br>"<" [SP] <num_bytes> SP <init_string> [SP] ">" |

TABLE 4-continued

| Byte code: | Machine instructions/comments: |
|---|---|
| num_bytes | Numeric value of number of bytes to allocate |
| Init_string | Hexadecimal byte string. The number of bytes in the string should be less or equal to num_bytes |
| all_cons | <num_cons> [SP] <cons_list> |
| num_cons | The count constraint units in the cons_list |
| cons_list | <cons_list> [SP] <constraint> | <constraint> |
| constraint | "(" [SP] <offset> SP <num_inject> [SP] <inject_list> [SP] ")" |
| offset | The starting injection address is the base address of the DLL or other library plus the offset. |
| num_inject | The count of inject units in inject_list. The number of inject units has to be less than 256. |

Regarding the following entries, the inject units, e.g., constraint code segments, of the inject list will be inserted sequentially in to the program. Thus, the control flow through the last instruction of a inject unit will reach the first instruction of the next unit. After executing the last instruction in the last inject unit, the first instruction of the basic block, one at the address pointed by the offset, will be executed. Note that the addresses for the instructions are not specified and the instructions will be relocated by the MPEE.

| | |
|---|---|
| inject_list | <inject_list> [SP] "<" <inject> ">" | "<" <inject> ">" |
| inject | <instr_string> | <branch_instr> | <library_call> | <lea> | <frame_in> | <frame_out> |

The following entries provide a byte string of instructions. Canstandardize on little endian or big endian.

| | |
|---|---|
| instr_string | "X" <instr_pack> |
| instr_pack | A hexadecimal byte string of a list of non-control-transfer instructions. No instructions that use PC offset are in the list. |
| branch_instr | "B" <jump short> | "B" <jump absolute> | "B" <return> |
| jump_short | <js_opcode> <js_num> |
| js_opcode | A hexadecimal word of the opcodes of Jcc (Jump if Condition) instruction. Only the Jump Short instructions are supported. The valid opcodes are: |

| | | | |
|---|---|---|---|
| JO | 70 | JS | 78 |
| JB | 72 | JNS | 79 |
| JNO | 71 | JP | 7A |
| JC | 72 | JPE | 7A |
| JNAE | 72 | JNP | 7B |
| JAE | 73 | JPO | 7B |
| JNB | 73 | JL | 7C |
| JNC | 73 | JNGE | 7C |
| JE | 74 | JGE | 7D |
| JZ | 74 | JNL | 7D |
| JNE | 75 | JLE | 7E |
| JNZ | 75 | JNG | 7E |
| JBE | 76 | JG | 7F |
| JNA | 76 | JNLE | 7F |
| JA | 77 | JCXZ | E3 |
| JNBE | 77 | JECXZ | E3 |

| | |
|---|---|
| js_num | Two bytes in hex format. The integer identifies a constraint from the cons_list. The constraints are numbered implicitly from 0 upwards in the order they are in the constraint list. This number is translated to the correct relative address so that the branch will take the control to the beginning of that constraint. |
| jump_absolute | Byte string of a JMP (jump) instruction with absolute address given in an operand. The valid instructions are |
| | JMP ptr16:16      EA cd |
| | JMP ptr16:32      EA cp |
| return | Byte string of one of the return instructions: |
| | RET      C3 |
| | RET      C2XX |
| | RET      CAXX |

The following entries provide a mechanism to load the address of a global data item. Note that references to globals will need to use this restricted form to get the address.

| | |
|---|---|
| lea | "L" r32 data_num |
| r32 | A one byte integer value that select one of the 32-bit registers. |
| | EAX      0 |
| | ECX      1 |
| | EDX      2 |
| | EBX      3 |
| data_num | Two bytes in hex format. The integer identifies a data item from the glob_list. The data are numbered implicitly from 0 upwards in the order they are in the glob_list. This number is translated to the correct relative address so that the load effective address will load the beginning address of the assigned location for the data. |

The following two pseudo instructions create a new frame for the constraint instructions to use and restore the application frame. "Frame in" will switch the stack to the internal DR stack and save the original registers and arithmetic flags (but not the floating point context). "Frame out" restores the original application frame, and restores the registers and the arithmetic flags to the state when the frame_in was called. Only a single frame_in can be issued within a constraint. When frame_in is issued, it requires a single invocation

TABLE 4-continued

| Byte code: | Machine instructions/comments: |
|---|---|
| | of frame_out before giving control back to the application. Note that this cannot be done as a library call since library calls require a usable stack. |
| frame_in | "FI" |
| frame_out | "FO" |
| | The following instructions invoke a library routine from the constraint injection support library. The call frame setup and breakdown is similar to the normal C calling convention. Thus, in order to call a library function, a new frame needs to be present. |
| library_call | "C" library_num |
| library_num | Two bytes in hex format. The integer identifies the library routine to be invoked. |

11. Constraint Application Policy

Combining the information provided in the constraint descriptor with the current machine state (e.g., version of the OS, application, libraries loaded, etc.), current threat landscape, information on other related constraints and user instructions, the constraint injection system can decide which applications the constraint should be injected into, and when to perform that task. The filtering of the constraints for a given application can be performed using the following information/criteria:

OS version
Existence of a given module in the application
File name of the executable and the modules. For example, the executable can be a Microsoft Windows® portable executable file (such as EXE, DLL, ActiveX controls, and several other Windows® executable formats)
Executable version of the executable and the modules
Executable checksum of the executable and the modules
Executable timestamp of the executable and the modules
Executable size of the executable and the modules
User input on where to deploy the constraint
Triggered by an internal application event such as signals or exceptions or any anomalous behavior
Triggered by externally visible application event such as excessive resource usage
Triggered by a system event such as user login or an initiation of a network connection
Within a predefined time window or system-specific time window such as during the system bootup.
Existence of a replacement constraint
Existence of conflicting constraint

12. Constraint Administration

The constraints can be created by an appropriate vendor, as discussed previously in connection with FIG. 2. Users who wish to deploy the constraints, using a central management console, download the constraints and manage them, as discussed in connection with FIG. 4a. The controller 420 interfaces with a node manager at each server. The node manager in turn interfaces with the core constraint injection system that runs on the protected applications. Using the controller, the users have the ability to manage the system at the granularity of a constraint and obtain information on the status and effectiveness of each constraint. The user is able to dynamically turn a constraint on and off, and to put a constraint into a detect or protect mode, as discussed previously. The user is also provided with the deployment status and statistics on each constraint. This feedback information can include:

Status
  Off—turned off by the user.
  Forced off—turned off due to excessive number of errors or exceptions.
  Not active—no matching set was found.
  Detect—at least one set is active, e.g., constraint injected, in detect mode.
  Protect—same as above but in protect mode.
  In transition—status is changing; could be in the middle of an injection or be waiting to inject after a matching set was found.
Statistics
  Number of times a vulnerability was detected.
  Number of times a vulnerability was not detected.
  Number of times a detector returned an error.
  Number of times a vulnerability was protected.
  Number of times a protector returned error.
  Number of times a protector requested to kill the current thread.
  Number of times a protector requested to kill the current process.
  Number of times a protector requested to raise an exception.
  Number of times a protector requested a change in application's control flow.
  Number of times a protector returned a silent status, e.g., didn't want an event logged.
  Number of times a detector or protector was aborted by the constraint system due to errors such as exceptions or infinite loops.

Each violation detected by the constraint or an error detected by the constraint injection system can generate an event to an event log. It is also possible to generate a forensics file for further analysis.

13. Constraint Injecting and Flushing

Once a patch point has been identified, the injection takes place. The code injected can save the application's stack, switch to the constraint stack, push all of the application's registers on to the stack and start constraint execution. After constraint execution, the application registers and stack are restored, and the control flow resumes at the actual instruction at the patch point. After the injection is completed, and before the constraint is executed, "constraint_reset_function" is invoked to set up a state required by the constraint.

Bookkeeping, such as status, statistics, violation reporting, etc., can be done for each constraint, so that the constraints execution can be wrapped in a sandbox. This can be done using a gateway function or a prologue-epilogue function pair, for instance. The advantage of using a gateway is that only the call to the gateway can be injected at the call site. However, this means that the constraint (both the remediator and detector) can be invoked with a function pointer inside the constraint injection system, which is considered to be a security hazard. This problem can be overcome using a prologue-epilogue function pair. That is, at the call site, inject a call to a prologue function, then a call to the detector, then to the remediator and then to the epilogue along with control flow logic as needed. However, one drawback is that a large amount of code has to be injected for a given patch point. If the security issue with the gateway model can be resolved (using write protection for core text or doing a target validation before calling it), that model should be favored.

If more than one constraint needs to be applied at a point, the "precedence" (Table 2) is used to determine the order of injection. Note that each constraint does not get a new clean set of application registers. There will be only one set. If an earlier constraint modifies it, then the subsequent constraint can see the change. Otherwise, the remediation offered by an earlier constraint will be lost. The constraint can be designed to handle this situation.

The atomicity of injection can be at the "vulnerability" level, not "policy" level, e.g., if all modules required by at least one "set" in a "vulnerability" are satisfied, then its constraint will be injected even if other "vulnerabilities" in the same "policy" aren't ready. If injection isn't done at this level, then a "vulnerability" can be exposed until others in its "policy" are ready to be patched, which defeats the purpose of constraint injection.

Another dimension of atomicity is whether to inject the constraint as each DLL matches or wait until all DLLs required for a given "vulnerability", when the libraries are DLLs. Injecting when all DLLs are matched for a given "vulnerability" is logical from an atomicity point of view. However, if one DLL is loaded early and matches, and another DLL is loaded later in the execution, the security hole in the first DLL will be unpatched until the second DLL is loaded. This can be handled by creating another "vulnerability" for the same policy with a different "set". Thus, both the inject-as-you-load and the inject-after-all-are-loaded approaches have merits and demerits.

Unlike injecting, flushing happens only at a "policy" level. Flushing means that the fix offered by a policy is being removed, which means for all its "vulnerabilities". A "policy" can be flushed under one of the following circumstances:

When new policy information is read in, either at start up or during a nudge (e.g., notification, FIG. 4a).

When mode changes are read in, either at start up or during a nudge.

When a library is unloaded. Flushing in this case is already taken care of by the core. Nothing needs to be done for library loading.

When the number of times a constraint returns an error or is aborted due to exceptions reaches a certain threshold.

Immediately after flushing, "constraint_reset_function" is invoked to clear up a constraint state.

14. Constraint—Information Verification

As constraint information will be transmitted from the constraint developer to the customer site and eventually to the core of an application, verifying the integrity of the information at the customer site is key to prevent problems due to tampering.

First, the transmitted XML file, e.g., descriptor file, should be verified by the CME 330. Signed certificates can be used to communicate with the constraint developer's web site, for instance, to download the XML file. Once the file is obtained, it can be verified using the "xml_file_signature" (Table 2).

Second, the integrity of the constraint library transmitted should be verified. For each "constraint_dll", in a "policy", there exists a "constraint_dll_hash". Using this hash value, the core can validate a constraint library. A verification failure will result in an event being logged.

15. ABI of the Constraint Library

Since constraints should have a minimal impact on the application and its availability, what goes into a constraint library can be highly restricted to avoid an adverse impact on a live application. For example, the following restrictions or set of rules can be imposed on the constraints using an ABI:

Should not define a library initialization function.

Should not overwrite any existing functions in the application or core.

Should only export the detector, remediator and initialization functions as described in the XML file.

Should not import any other application or core functions outside the provided interface.

Should not do system calls.

Should minimize the use of statically linked functions, especially ones with side effects.

Should not access or change core's data structures other than through the provided interface.

16. ABI of the Detector

Each detector can be called with one argument, namely a pointer to a context structure. Macros can be provided to the constraint writer to read and write to the application's registers using this pointer. Each detector can return one of the following status codes:

Detected

Not detected

Error

The following additional restrictions or set of rules can be imposed on the detector using an ABI:

Should not modify application registers.

Should not modify memory other than what is allocated for constraint use.

All loops should have a verifiable static loop bounds check, thus preventing infinite loops.

All functions calls made should be either in the approved core interface list or adhere to a well defined set of properties.

In all functions that modify non-local memory, either global or pointed by an argument, the memory should not be application-visible.

For all functions that modify memory, the buffer should be sufficiently large and the buffer size and the bounds of the memory modification should be statically verifiable.

Should not invoke system calls.

A program analysis tool can be used to check and enforce these guidelines during constraint development. However, the guidelines are not absolute rules. In those rare occasions when no other option is available, these guidelines can be ignored. But, it should be done after much consideration, approval from an oversight team and a lot of quality assurance. Note that byte code based constraints can make the task of enforcing these ABI restrictions simple and make it possible to validate the ABI in the constraint injection system.

17. ABI of the Remediator

Each remediator can be called with the two arguments. The first is the same as for the detectors, which is used by the remediator to read and write to application registers (unlike the detector which can only read). The second is a pointer to a buffer of fixed size which can be used by the remediator to provide information that can be written to the event log. The remediator can perform one or more of the following:

Modify application state (memory and/or registers)

Kill the current thread

Kill the current process

Raise an exception

Change control flow to "return_addr" specified in the XML file

Change control flow to a calculated address

Issue an event or message

Indicate an Error

The following additional restrictions or set of rules can be imposed on the remediator using an ABI:
- All loops should have a verifiable static loop bounds check, thus preventing infinite loops.
- All functions calls made should be either in the approved core interface list or adhere to a well defined set of properties.
- Should not invoke system calls.

18. Exceptions in Constraint Code

The execution of a constraint can result in an infinite loop or access violation exception (due to dereferencing NULL, invalid or protected memory). The constraint injection system need not deal with infinite loops; instead, the constraint writer can deal with it at constraint creation time as an ABI restriction.

In the case of an access violation, a constraint injection system's exception handler can identify the exception to be related to a constraint, terminate the constraint execution and return to the gateway/prologue-epilogue function with the appropriate status code and let the reminder of the cleanup and bookkeeping be done by that function.

19. Functions Called by the Constraints

The detector and remediator ABIs allow the detector and remediator, respectively, to call a predefined set of support functions, including functions belonging to the following classes:
- Reporting
- String manipulation
- Synchronization
- Error handling
- Freezing the application (for atomic updates to the application)
- Global and thread-private memory allocation and deallocation
- Notification on thread creation and deletion Care should be taken when the functions change the application-visible state to avoid a program crash. Functions called by the detector have further restrictions such as avoiding modifications to any application-visible state.

20. Using the Managed Program Execution Core

The Managed Program Execution Core in the Memory Firewall™ product, available from Determina Corp., Redwood City, Calif., provides a suitable substrate to implement a constraint injection system. Since the core creates a code cache and executes all instructions through the cache, it is possible to insert any instruction sequence at an arbitrary address. The code cache creation process allows for atomic insertions and deletions of constraints. It also provides the basis for sandboxed execution of the constraints. The core also has the mechanisms to provide input-output (I/O) and memory management functions minimally visible to the application. However, the use of this product is an example implementation only as other implementations are also possible.

21. Supported Applications Classes

It is difficult, if not impossible, to provide customized constraints for every application used by all customers. This would require having thousands of installations and quality assurance support. Furthermore, application customization and multiple versions can make this task even more difficult. To simplify matters, applications can be divided into three categories.

21a. Applications Available at the Constraint Development Lab (e.g., the Security Laboratory)
- The constraint developer has the full knowledge of the application
- A full working installation is available for all supported versions
- A quality assurance framework is available to reasonably assure the quality of the applications
- Constraints are built to fix the specific vulnerability in the application
- Examples: Microsoft Windows® services, Internet Information Services (IIS) (a Microsoft® web server), and Oracle® database software.

21b. Applications Accessible by the Constraint Developers
- The constraint developer uses the application for one-time analysis
- Validation/Interception points are built by analyzing the application
  - External input vs. local input vs. administrator input filter points
  - Expanded buffer interception points
  - Categorization of paths to system calls
- Examples: PeopleSoft enterprise application software, Siebel business application software, WinZip compression utility, and IIS version-1.

21c. Applications Never Seen by the Constraint Developers
- No knowledge of the application
- Only Generic API Interception or custom libraries
- Examples: Foobar FTP server, custom applications.

22. Example Constraint Code

The following provides an example of constraint code for a constraint that protects against the vulnerability announced by Microsoft in their security bulletin MS03-007. This is an unchecked buffer vulnerability that can lead to a total system compromise in IIS due to the use of a long file name. Further details can be found at http://www.microsoft.com/technet/security/bulletin/MS03-007.mspx. After analyzing the vulnerability, the constraint developer produces a constraint. FIG. 9 provides the source code (detector and protector functions) of the constraint. The vulnerability relates to the use of a long file name. As indicated, the patch point is right before a call to the function RtlInitUnicodeString, which is a function that truncates a Unicode string's length to 16 bits integer. FIG. 10 provides a disassembly of the code in NTDLL.DLL where the constraint is applied. NTDLL.DLL is a core operating system component used to interact with the Windows® kernel. There is a simple vulnerability in this code. The length of the argument is not checked against the maximum possible length of a file name, creating an opportunity for a buffer overflow attack. Thus, a constraint as described above is injected to check the length before calling the function RtlInitUnicodeString. FIG. 11 provides an XML file that is produced and shipped to customers. The XML file provides the information needed to identify the need for a constraint and deploy the constraint to the Central Controller at the customer site. It provides information for the customer, identifying which vulnerability is protected, information on when and where to deploy the constraint and information about detector and protector functions provided.

23. Standalone Framework for Constraint Injection

Another embodiment of constraint injection involves using a standalone framework that loads and inject the constraints directly into the application memory without using a code cache. In this approach, when a protected application is started, a special DLL or other library that manages constraints is loaded. This library implements a routine that the Constraint Management Engine (CME) can invoke when a change to the set of constraints or change to the deployment has occurred. This can be done in two ways. One method is by inserting hooks (or callbacks) onto the application's regular control-flow so that when the application executes it will invoke a DLL or other library routine on a regular basis. Another method is to use special operating system mechanisms to invoke a routine in the application from an external call from the CME.

When the constraint manager routine of the DLL or other library is invoked, it will check with the CME regarding which constraints should be applicable to the application. This will occur either at the startup or when CME provides a notification that there is a change or when a new library is loaded. At startup, all active libraries loaded into the memory are scanned and that version information is matched with the list of constraints given by the CME. When the CME provides a notification of a change to the list, again that active library list is checked against the updated constraint list provided by the CME. The loading of a new library is detected by hooking the loading process. When this hook is invoked, it will check the new library against the constraint list provided by the CME. A new constraint can be installed or an active constraint is deactivated using the following mechanism.

First, it is desirable to guarantee that all the threads that are executing in the address space are at a safe point which allows modify of the memory image without creating race conditions. One way to enforce this is to suspend all the threads and check the program counter location on which the threads were suspended. If the program counter is at an unsafe location, then that thread is resumed and allowed to reach a safe point at which it is suspended again. Or, the current program counter can be relocated to the constraint gateway. It is desirable to ensure that this process is safe with respect to the loader modifying the application image since the loader may modify the memory image of the library. This can nominally be done by waiting until the loader finishes the modifying of the memory. An alternative method to enforcing safety without suspending all threads is to make sure that modifications to the memory image can coexist with execution of that region. This can be achieved, e.g., by using atomic updates if the instruction inserted is small, or by first atomically inserting a few instructions which will generate a fault if they are executed and then changing the needed instructions from the bottom-up. If a thread reaches the modification region while it is being modified, it will throw an exception, which can be caught. When an exception is caught, the thread is stopped until the injection is over.

Second, the constraint can be loaded into the memory if it is not already loaded into the memory image. This can be done by using the loader, if the constraint is given as a regular DLL or other library, or by copying the constraint instructions into the memory using a custom loader.

Next, each patch point is examined to ensure that it conforms to the specification of the patch point. In this case, the patch point should have the following eight additional restrictions listed below, in one example implementation.

1. A patch point specifies the address where the constraint is injected into the application code. The patch point must always be at an instruction boundary. The five bytes after the patch point are called a "patch region" and will be overwritten during constraint injection. The bytes taken by the instructions that start in the patch region are known as the "extended patch region". If the last instruction in the patch region extends past the end of it, the expended patch region will be greater than five bytes. For example, see Table 5.

TABLE 5

| text: 767A6E1C 50 | push | eax | |
| text: 767A6E1D 64 89 25 00 00 00 00 | mov | large | fs: 0, esp |
| text: 767A6E24 51 | push | ecx | |

If the patch point is 767A6E1C, the patch region will cover five bytes from address 767A6E1C to 767A6E21. The extended patch region will cover eight bytes from address 767A6E1C to 767A6E23.

2. None of the bytes in the patch region can be a target of a control transfer instruction anywhere in the program.

3. None of the instructions that end in the first four bytes of the patch region can be a CALL or a non-conditional JMP instruction. It is acceptable for a CALL or JMP instruction to end at the last byte of the patch region.

4. None of the bytes in the patch region can be read anywhere in the program.

5. None of the bytes in the extended patch region can be written anywhere in the program.

6. None of the instructions that start in the patch region can be an INT or an INT3 instruction.

7. As a consequence of restriction #4, the extended patch region must not include any relocations.

8. The patch region must not cross a thirty-two byte cache line boundary (only required if using atomic injection).

Before proceeding with the injection, we calculate the validity of the patch point by computing a hash function of the instructions in the vicinity of the patch point. However, if another constraint was injected within the vicinity, then the computation of the hash function needs to utilize the original instructions that were moved to the constraint gateway.

Next, the patch point in the application memory is modified to insert a control transfer instruction to the constraint gateway. Before the modification occurs, the application instruction(s) at the patch point are copied to the constraint gateway so they will get executed before (or after) the constraint is executed. However, if the instructions that are copied over are control transfer instructions that have relative addressing, the address has to be modified. This may require expansion of the relative address size.

If the constraint being injected requests control flow transfer to another location as one of its remediation actions, and if that location is already patched with a different constraint, then the control flow transfer is modified to go directly to that constraint. Furthermore, if any other active constraints require control flow transfers to the patch point of the current constraint, these transfers are also modified to go to the constraint directly.

The system also intercepts any memory protection to make a read-only page writable. The constraints are removed, and when the page is made executable again, the injection process is performed again.

Figure 12:
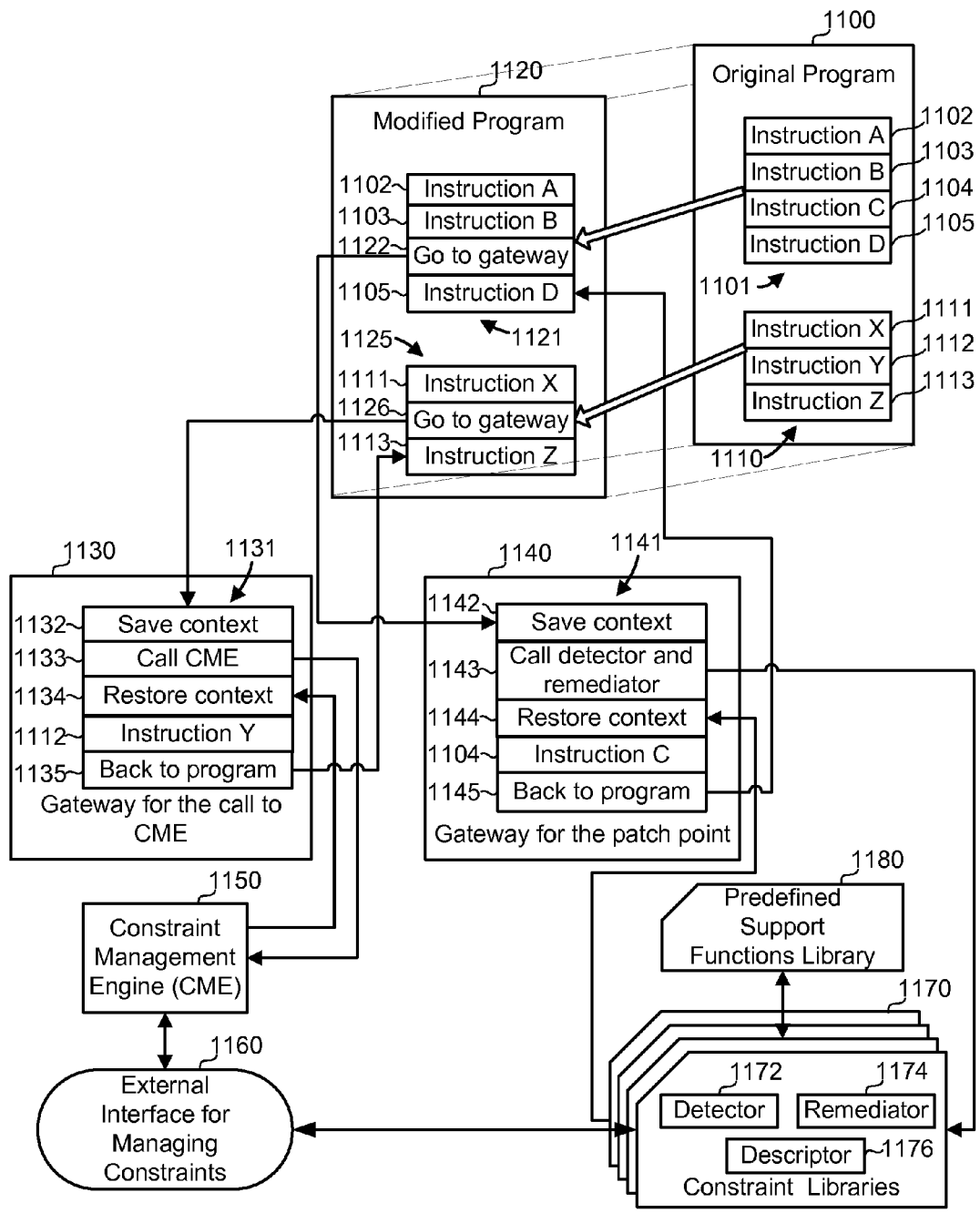
FIG. 12 illustrates a software architecture for deploying a constraint within an application without using a code cache.

FIG. 12 illustrates a software architecture for deploying a constraint within an application without using a secure code cache. The architecture provided is similar to that of FIG. 3, except there is no MPEE or code cache. The architecture depicts the original program 1100, before a constraint is inserted, and the modified program in memory 1120. The original program 1100 and the modified program 1120 exist at different times because the modified program is not stored separately from the original program. That is, the original program is modified, not a copy of the original program. The original program 1100 includes a code fragment 1101 which has a number of instructions, e.g., instruction A 1102, instruction B 1103, instruction C 1104 and instruction D 1105, for instance. A code fragment 1110 represents commonly executed paths, e.g., instructions, in the original program, and includes instruction X 1111, instruction Y 1112 and instruction Z 1113. The modified program 1120 includes a modified code fragment 1121 which is obtained by modifying the original code fragment 1101 by replacing instruction C 1104 with a go to gateway instruction 1122. Additionally, the modified code fragment 1125 is obtained by modifying the original code fragment 1110 by replacing instruction Y 1112 with a go to gateway instruction 1126. Thus, patch points for the constraint code are provided between instructions 1103 and 1105, and between instructions 1111 and 1113.

Two gateways can be called from the modified program 1120 via trampolines provided by code fragments 1121 and 1125. The gateway for the call to CME 1130 includes a code fragment 1131 with a save context instruction 1132, a call CME instruction 1133, a restore context instruction 1134, the instruction Y 1112, and a back to program instruction 1135. Instruction Y 1112 can be executed before or after instruction 1133. A control flow is transferred from the gateway 1130 to the CME 1150 at the instruction 1133. The control flow returns to the gateway 1130 from the CME 1150 for executing the restore context instruction 1134, for example. The gateway for the patch point 1140 includes a code fragment 1141 with a save context instruction 1142, a call detector and remediator instruction 1143, a restore context instruction 1144, the instruction C 1104, and a back to program instruction 1145. A control flow is transferred from the gateway 1140 to the libraries 1170 at the instruction 1143. The control flow returns to the gateway 1140 from the libraries 1170 for executing the restore context instruction 1144, for example.

The CME 1150, external interface for managing constraints 1160, constraint libraries 1170, including detector 1172, remediator 1174 and descriptor 1176 libraries, and the predefined support functions library 1180, are comparable to their namesakes in FIG. 3, described previously.

At a patch point, an instruction of the code fragment 1101 is rewritten to provide the code fragment 1121 which includes a call, via the go to gateway instruction 1122, to the custom gateway for the patch point 1140. The saving and restoring is performed on the gateway for the patch point 1140. In particular, the application context is saved at instruction 1142. The detector 1172 and remediator 1174 libraries are called at instruction 1143. The control flow is returned to the gateway 1140 so that the application context is restored at instruction 1144. Instruction C 1104 is also called, before or after instruction 1143. The control flow then returns back to the program at instruction 1145. In particular, the control flow can return to instruction D 1105 of the modified program 1120, for instance.

Note that the instructions that were overwritten are copied to the gateways. In particular, instruction C 1104, which was overwritten by the go to gateway instruction 1122, was moved to the gateway for the patch point 1140, and instruction Y 1112, which was overwritten by the go to gateway instruction 1126, was copied to the gateway for the call to the CME 1130. In order to change the control flow to the CME 1150, trampolines are inserted in the commonly executed paths 1110, as indicated by code fragment 1125. The external interface for managing the constraints 1160 can also call the CME 1150. Thus, as the code fragment 1101 of the program executes, the control flow is transferred to the gateway 1140 for calling the constraint libraries 1170. As the code fragment 1110 executes, the control flow is transferred to the gateway 1130 for invoking the special DLL or other library that manages the constraints, such as by installing a new constraint, deactivating an active constraint, detecting the loading of a new library by the computer program, and determining which constraints are applicable to the computer program.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The processors can be in communication with one or more storage devices, peripherals and/or communication interfaces.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A non-transitory machine readable storage medium non-transiently storing computer instructions for immunizing a computer program against vulnerabilities and attacks at runtime, the computer instructions comprising:
   a node manager in communication with a central management console and configured to dynamically load a constraint library into a computer program while the computer program is running, the constraint library containing a constraint;
   a managed program execution engine configured to:
      determine insertion point information for the computer program that is associated with the constraint, wherein different constraints in the constraint library are associated with different insertion point information;
      analyze the computer program to determine an insertion point to insert constraint code associated with the constraint based on the insertion point information; and
      insert the constraint code associated with the constraint into the computer program while the computer program is running, the constraint code associated with machine instructions that correct a flaw of the computer program, the flaw being a security vulnerability or a bug;
   a constraint management engine in communication with the node manager and the managed program execution engine, the constraint management engine being configured to dynamically turn the constraint of the loaded constraint library on or off as the computer program is running, in response to user input; and
   a gateway in communication with the constraint management engine configured to receive a communication from the constraint management engine indicating whether the constraint is turned on or off, wherein the gateway receives a call from the constraint code and determines whether the machine instructions that correct the flaw of the computer program should be called based on whether the constraint is turned on or off.

2. The non-transitory machine readable storage medium of claim 1, wherein when the constraint is off, machine instructions that correct the flow of the computer program are not called and when the constraint is on, machine instructions that correct the flaw of the computer program are called.

3. The non-transitory machine readable storage medium of claim 1, wherein the constraint library is loaded into the computer program and dynamically turned on without restarting of the computer program.

4. The non-transitory machine readable storage medium of claim 1, wherein the constraint code is inserted in computer program instructions of the computer program that reside in a memory of a computer system executing the computer program.

5. The non-transitory machine readable storage medium of claim 1, wherein the managed program execution engine manages a code cache, wherein a code fragment of the computer program is modified to insert one or more instructions of the constraint code to call the constraint in the dynamically loaded library.

6. The non-transitory machine readable storage medium of claim 5, wherein a user input specifies a location to insert the one or more instructions of the constraint code in the code fragment.

7. The non-transitory machine readable storage medium of claim 1, wherein the dynamically loaded constraint library is loaded into constraint library storage, wherein the constraint is called from the constraint library in the constraint library storage when the constraint is turned on.

8. The non-transitory machine readable storage medium of claim 1, wherein:
the library is loaded in an off state, and
the library is turned on allowing the constraint to be called from the constraint code inserted in the computer program.

9. The non-transitory machine readable storage medium of claim 1, wherein the constraint management engine is configured to:
call a detector function in the library without calling a remediator function in the library when the constraint has been dynamically switched to a detection mode, and
call a detector function in the library and a remediator function in the library when the constraint has been dynamically switched to a remediation mode.

10. A method for immunizing a computer program against vulnerabilities and attacks at runtime, the method comprising:
dynamically loading a constraint library into a computer program while the computer program is running, the constraint library containing a constraint;
determining insertion point information for the computer program that is associated with the constraint, wherein different constraints in the constraint library are associated with different insertion point information;
analyzing the computer program to determine an insertion point to insert constraint code associated with the constraint based on the insertion point information;
inserting the constraint code associated with the constraint into the computer program while the computer program is running, the constraint code associated with machine instructions that correct a flaw of the computer program, the flaw being a security vulnerability or a bug;
dynamically turning the constraint of the loaded constraint library on or off as the computer program is running, in response to user input; and
receiving a call from the constraint code and determining whether the machine instructions that correct the flaw of the computer program should be called based on whether the constraint is turned on or off.

11. The method of claim 10, wherein when the constraint is off, machine instructions that correct the flow of the computer program are not called and when the constraint is on, machine instructions that correct the flaw of the computer program are called.

12. The method of claim 10, wherein the constraint library is loaded into the computer program and dynamically turned on without restarting of the computer program.

13. The method of claim 10, wherein the constraint code is inserted in computer program instructions of the computer program that reside in a memory of a computer system executing the computer program.

14. The method of claim 10, wherein inserting comprises:
loading a code fragment of the computer program into a code cache; and
modifying the code fragment to insert one or more instructions of the constraint code to call the constraint of the dynamically loaded library.

15. The method of claim 14, wherein a user input specifies a location to insert the one or more instructions of the constraint code in the code fragment.

16. The method of claim 10, wherein the dynamically loaded constraint library is loaded into constraint library storage, wherein the constraint is called from the constraint library in the constraint library storage when the constraint is turned on.

17. The method of claim 10, wherein:
the library is loaded in an off state, and
the library is turned on allowing the constraint to be called from the constraint code inserted in the computer program.

18. The method of claim 10, further comprising:
calling a detector function in the library without calling a remediator function in the library when the constraint has been dynamically switched to a detection mode, and
calling a detector function in the library and a remediator function in the library when the constraint has been dynamically switched to a remediation mode.

19. An apparatus configured to immunize a computer program against vulnerabilities and attacks at runtime, the apparatus comprising:
one or more computer processors; and
a non-transitory computer-readable storage medium comprising instructions for controlling the one or more computer processors to be configured to:
dynamically load a constraint library into a computer program while the computer program is running, the constraint library containing a constraint;
determine insertion point information for the computer program that is associated with the constraint, wherein different constraints in the constraint library are associated with different insertion point information;
analyze the computer program to determine an insertion point to insert constraint code associated with the constraint based on the insertion point information;
insert the constraint code associated with the constraint into the computer program while the computer program is running, the constraint code associated with machine instructions that correct a flaw of the computer program, the flaw being a security vulnerability or a bug;
dynamically turn the constraint of the loaded constraint library on or off as the computer program is running, in response to user input; and
receive a call from the constraint code and determining whether the machine instructions that correct the flaw of the computer program should be called based on whether the constraint is turned on or off.

20. The apparatus of claim 19, wherein when the constraint is off, machine instructions that correct the flow of the computer program are not called and when the constraint is on, machine instructions that correct the flaw of the computer program are called.

21. A non-transitory machine readable storage medium non-transiently storing computer instructions for immunizing a computer program against vulnerabilities and attacks at runtime, the computer instructions comprising:
- a node manager in communication with a central management console and configured to dynamically load a constraint library into a computer program while the computer program is running, the constraint library containing a constraint;
- a managed program execution engine configured to insert constraint code associated with the constraint of the loaded library into the computer program while the computer program is running, the constraint code associated with machine instructions that correct a flaw of the computer program, the flaw being a security vulnerability or a bug; and
- a constraint management engine in communication with the node manager and the managed program execution engine, the constraint management engine being configured to dynamically switch the constraint of the loaded constraint library between a detection mode that detects the flaw, but does not remediate the flaw, and a remediation mode that detects and remediates the flaw as the computer program is running when it is determined that the machine instructions that correct the flaw of the computer program should be called based on whether the constraint is turned on or off, in response to user input.

* * * * *